US006034652A

United States Patent [19]

Freiberger et al.

[11] Patent Number: 6,034,652

[45] **Date of Patent: *Mar. 7, 2000**

[54] ATTENTION MANAGER FOR OCCUPYING THE PERIPHERAL ATTENTION OF A PERSON IN THE VICINITY OF A DISPLAY DEVICE

[75] Inventors: Paul A. Freiberger, San Mateo, Calif.; Golan Levin, Staten Island, N.Y.; David P. Reed, Atherton, Calif.; Marc E. Davis, San Francisco, Calif.; Neal A. Bhadkamkar; Philippe P. Piernot, both of Palo Alto, Calif.; Todd A. Agulnick, San Francisco, Calif.; Sally N. Rosenthal, Palo Alto, Calif.; Giles N. Goodhead, Los Angeles, Calif.

[73] Assignee: Interval Research Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/620,641

[22] Filed: Mar. 22, 1996

[51] Int. Cl.[7] .............................. G09G 5/12; G09G 5/14; G06F 15/16

[52] U.S. Cl. ............................... 345/2; 345/115; 709/218

[58] Field of Search ............................... 345/2, 115, 116, 345/302, 326; 707/10, 104, 501; 395/200.47, 200.48, 200.49; 709/217, 218, 219

[56] References Cited

U.S. PATENT DOCUMENTS

| | | | |
|---|---|---|---|
| 4,845,658 | 7/1989 | Gifford | 395/200.47 |
| 5,105,184 | 4/1992 | Pirani et al. | 345/115 |
| 5,305,195 | 4/1994 | Murphy | 705/1 |
| 5,347,632 | 9/1994 | Filepp et al. | 395/200.32 |
| 5,573,643 | 11/1996 | Judson | 395/200.48 |
| 5,740,549 | 4/1998 | Reilly et al. | 705/14 |
| 5,768,528 | 6/1998 | Stumm | 395/200.61 |

FOREIGN PATENT DOCUMENTS

| | | |
|---|---|---|
| WO 93/19427 | 9/1993 | WIPO . |
| WO 96/30864 | 10/1996 | WIPO . |

OTHER PUBLICATIONS

Gomes, Lee, "Upstart's Internet 'TV' Has Microsoft Tuned In", Wall Street Journal, Aug. 1996.

Joan E. Rigdon, "Screen Savers Go Beyond Fish, Flying Toasters," *Wall Street Journal*, Feb. 13, 1996.

Staff Reporter, "PointCast Inc. Is Testing New Screen–Saver Product," *Wall Street Journal*, May 1996.

*Primary Examiner*—Jeffery Brier
*Attorney, Agent, or Firm*—David R. Graham

[57] ABSTRACT

An attention manager presents information to a person in the vicinity of a display device in a manner that engages at least the peripheral attention of the person. The information is embodied by one or more sets of content data (e.g., video or audio data). Each set of content data is formulated by a content provider and made available for use by content display systems. Upon appropriate activation, each content display system displays images corresponding to the sets of content data in accordance with predetermined scheduling information. The attention manager makes use of "unused capacity" of the display device and the person's attention, providing information to the person that the person might not otherwise expend adequate energy to obtain. The attention manager also affords an opportunity to content providers to disseminate their information to people that are interested in receiving such information, enabling the content providers to provide better directed information dissemination, as well as providing access to the previously unused attention capacity of those interested people.

18 Claims, 8 Drawing Sheets

ATTENTION MANAGER FOR OCCUPYING THE PERIPHERAL ATTENTION OF A PERSON IN THE VICINITY OF A DISPLAY DEVICE

BACKGROUND OF THE INVENTION

1. Field of the Invention

This invention relates to the engagement of the peripheral attention of a person in the vicinity of a display device such as the display monitor of a computer.

2. Related Art

Information providers of all sorts have an interest in presenting their information to information consumers and, in particular, to information consumers who may, or do, have an interest in the particular information provided by the particular information provider. At the same time, information consumers have an interest in accessing a wide variety of information and, in particular, information in which the information consumer may, or does, have an interest. Given the extent to which computers now permeate society, and particularly in view of the escalation of networking of those computers in various ways, there is increasing recognition of the capability of using computers, and, in particular, computers (and other devices) that are interconnected in a network, as an information dissemination tool that can satisfy the interests of both information providers and information consumers.

For example, information providers have used public computer networks (e.g., the Internet) and private computer networks (e.g., commercial online services such as America Online, Prodigy and CompuServe) to disseminate their information. This information can be displayed to a computer user having access to the network directly in response to a request from the user or indirectly (i.e., without request by the user) as a result of another action taken by the user. While these methods of information dissemination and acquisition can be effective, they do not exhaust the possibilities.

In a different vein, historically, computers have frequently included screen saving mechanisms ("screen savers") intended to prevent the phosphors of a computer display screen from burning out when the same image remains on the screen for a long period of time, such as might occur during a long period of inactivity while the computer is operating. As computer display screen technology has progressed, the use of screen savers to preserve the display screen has become increasingly unnecessary. However, the use of screen savers has continued—even proliferated—likely due to the aesthetic or entertainment value provided by the imagery of many screen savers. Further, the use of "wallpaper" (i.e., a pattern generated in the background portions on a computer display screen) in computer display screens has also arisen, largely one would suspect because of the aesthetic or entertainment value of the wallpaper imagery. While the use of screen savers and wallpaper with computer displays appeals to many users because of the imagery they present to the user, screen savers and wallpaper have not heretofore been used as a means to convey information from information providers to computer users. Further, screen savers and wallpaper have previously been implemented as relatively simple, self-contained computer application programs that are not typically integrated with other application programs or other aspects of computer operation. In particular, screen saver and wallpaper application programs have not been constructed to enable retrieval of display content from a remote location via a computer network.

SUMMARY OF THE INVENTION

An attention manager according to the invention presents information to a person in the vicinity of a display device in a manner that engages the peripheral attention of the person. Often, the display device is part of a broader apparatus (e.g., the display device of a computer). Generally, the attention manager makes use of "unused capacity" of the display device. For example, the information can be presented to the person while the apparatus (e.g., computer) is operating, but during inactive periods (i.e., when a user is not engaged in an intensive interaction with the apparatus). Or, the information can be presented to the person during active periods (i.e., when a user is engaged in an intensive interaction with the apparatus), but in an unobtrusive manner that does not distract the user from the primary interaction with the apparatus (e.g., the information is presented in areas of a display screen that are not used by displayed information associated with the primary interaction with the apparatus).

The information is embodied as one or more sets of content data. The sets of content data represent sensory data; typically, the sensory data is either video or audio data. Each set of content data is formulated by a content provider and made available for use by an attention manager according to the invention. Each content providing system can provide more than one set of content data. The content providing systems provide user interface tools that enable a particular set of content data to be requested. Once one or more sets of content data has been acquired, a content display system integrates scheduling information for all sets of content data to produce a schedule according to which an image or images corresponding to the sets of content data are displayed on a display device associated with the content display system.

A set or sets of instructions for enabling a display device to selectively display an image or images generated from a set of content data are also made available for use by the content display systems. Typically, the instructions enable images generated from content data to be displayed automatically, without user intervention, in a predetermined manner, thereby enhancing the capability of the invention to occupy the user's peripheral attention. Further, the attention manager can be implemented so that the instructions are automatically acquired (or updated, if necessary) each time a user requests acquisition of a set of content data, thereby making acquisition of the instructions transparent to the user of the attention manager and thus increasing the ease of use for the user. The instructions can include application instructions, control instructions and content data acquisition instructions. The application instructions can include operating instructions for beginning, managing, and terminating operation of the attention manager on a content display system, content display system scheduling instructions for scheduling the display of content data on a content display system, and installation instructions for installing the operating instructions and content display system scheduling instructions on a content display system. The control instructions can include display instructions for enabling generation of images from the content data on a particular type of display device or from a particular type of content data, and content data scheduling instructions for enabling temporal control of the display of the images generated from a set or sets of content data. The content data acquisition instructions can include acquisition instructions for enabling the acquisition of a set of content data, content data update instructions for enabling update of a previously acquired set of content data, and user interface installation instructions for enabling provision of a user interface that allows a person to request a set of content data from a content providing system. Each of the application, control and content data acquisition instructions could be acquired from a content provider, or any one or all of the sets of instructions could be acquired from an application manager that provides generic sets of instructions that can be tailored as necessary or desirable by a content provider. Additionally, audit instructions can be made available that enable monitoring of usage of the attention manager.

According to one aspect of the invention, an attention manager engages the peripheral attention of a person in the vicinity of a display device of an apparatus by acquiring one or more sets of content data from a content providing system and selectively displaying on the display device, in an unobtrusive manner that does not distract a user of the apparatus from a primary interaction with the apparatus, an image or images generated from the set of content data. According to a further aspect of the invention, the selective display of the image or images begins automatically after detection of an idle period of predetermined duration (the "screen saver embodiment"). This aspect can be implemented, for example, using the screen saver API (application program interface) that is part of many operating systems. According to another further aspect of the invention, the selective display of an image or images occurs while the user is engaged in a primary interaction with the apparatus, which primary interaction can result in the display of an image or images in addition to the image or images generated from the set of content data (the "wallpaper embodiment"). If multitasking is allowed by the apparatus (e.g., by the computer operating system) with which the attention manager is used, the attention manager can be implemented so that, when operation of the attention manager is terminated, the user is returned to the state of the primary interaction that existed when operation of the attention manager began. The attention manager can also be implemented so that, during operation of the attention manager, the user is presented with a number of options regarding further use of the attention manager. In particular, one of the options can allow additional information to be obtained that is related to the set of content data for which an image is being displayed. Where the attention manager is implemented as part of a network, this option can enable information to be obtained from a remote information source via the network. Another option that can be implemented allows a user to specify a satisfaction level for a set of content data from which an image or images is being displayed, thereby affecting the frequency with which that set of content data is used by the attention manager in the future.

According to another aspect of the invention, an attention manager that engages the peripheral attention of a person in the vicinity of a display device includes a content display system associated with the display device, a mechanism that can communicate with the content display system via a first communications mechanism to provide to the content display system a set of instructions for enabling the display device to selectively display content data, and a content providing system that can communicate with the content display device via a second communications mechanism to provide a set of content data to the content display system. The content display system uses the provided set of instructions to selectively display on the display device an image or images generated from the provided content data. The attention manager according to this aspect of the invention can further include an application management system that can communicate via a third communications mechanism to provide to either the content providing system or the content display system one or more sets of instructions for enabling a display device to selectively display an image or images generated from a set of content data. In the former case, the content providing system can, in turn, communicate with the content display system to provide the one or more sets of instructions. The attention manager according to this aspect of the invention can be implemented, for example, using existing computer networks of information sources, such as the Internet (in particular, the World Wide Web) or commercial online services, advantageously making use of pre-existing hardware and software for enabling communication over those networks. Typically, though not necessarily, an attention manager according to this aspect of the invention will include multiple content display systems and multiple content providing systems. The content providing systems will each be capable of providing one or more sets of content data, so that, overall, there will be multiple available sets of content data which can be of different types. There can also be multiple sets of instructions for enabling a display device to selectively display an image or images generated from a set of content data, which sets of instructions may be tailored to display images from particular types of content data or to display content data using a particular display device.

According to yet another aspect of the invention, a computer readable medium can be encoded with one or more computer programs for enabling acquisition of a set of content data and display of an image or images generated from the set of content data on a display device during operation of an attention manager. The instructions of the computer program can include: i) acquisition instructions for enabling acquisition of a set of content data from a specified information source, ii) user interface installation instructions for enabling provision of a user interface that allows a person to request the set of content data from the specified information source, iii) content data scheduling instructions for providing temporal constraints on the display of the image or images generated from the set of content data, and iv) display instructions for enabling display of the image or images generated from the set of content data. The computer readable medium can also further include content data update instructions for enabling acquisition of an updated set of content data from an information source that corresponds to a previously acquired set of content data, the content data up date instructions specifying where and when to obtain the updated set of content data. The content data scheduling instructions can specify, for example, the duration of time that the image or images generated from a set of content data can be displayed, an order in which the images generated from a plurality of sets of content data are displayed, a time or times at which the image or images generated from a set of content data can or cannot be displayed, and/or constraint on the number of times that the image or images generated from a set of content data can be displayed. The display instructions can be tailored to enable display of the image or images generated from a set of content data on a display device of a particular type, or display of an image or images generated from a set of content data of a particular type.

According to still another aspect of the invention, a computer readable medium can be encoded with one or more computer programs for enabling a content display system to selectively display on a display device, in an unobtrusive manner that does not distract a person from a primary interaction with an apparatus associated with the display device, an image generated from a set of content data. The instructions of the computer program can include:

i) operating instructions for beginning, managing and terminating the selective display of the image on the display device, ii) content display system scheduling instructions for scheduling the display of the image on the display device, and iii) installation instructions for installing the operating instructions and content display system scheduling instructions on a content display system. The computer readable medium can also further include audit instructions for monitoring usage of the content display system to selectively display an image generated from a set of content data.

The attention manager according to the invention is a new and useful mechanism for providing information to users of the attention manager. The attention manager provides information in which a user has expressed an interest and, importantly, information that the user might not otherwise expend adequate energy to obtain. The user can tailor the information provided by interacting with specific information sources to indicate interest in particular information provided by a specific information source while the user is perusing other information from that information source (as opposed to giving a general indication of interest in information on a particular subject or of a particular kind, from which indication information that matches the indicated interest is automatically provided from various information sources). The user can also choose information from a wide variety of information sources; in particular, when the attention manager is implemented using a network (e.g., the Internet), the user can acquire information from a wide variety of remote information sources. Additionally, the information is presented to the user in a manner that uses portions of the user's attention capacity that may otherwise be unused or filled with extraneous information.

The attention manager according to the invention also provides a new and useful information dissemination tool to content providers. The attention manager affords an opportunity to content providers to disseminate their information to users that are interested in receiving such information, enabling the content providers to provide better directed information dissemination. Moreover, the attention manager provides access to the previously unused attention capacity of those interested users. Additionally, the attention manager allows content providers to tailor particular aspects of the attention manager as desired by the content provider, such as the acquisition of updated sets of the content provider's content data (e.g., the frequency of such updates), the display scheduling and manner of display of the content provider's content data, and the user interface that enables users to specify acquisition of the content provider's content data.

DETAILED DESCRIPTION OF THE INVENTION

Figure 1:
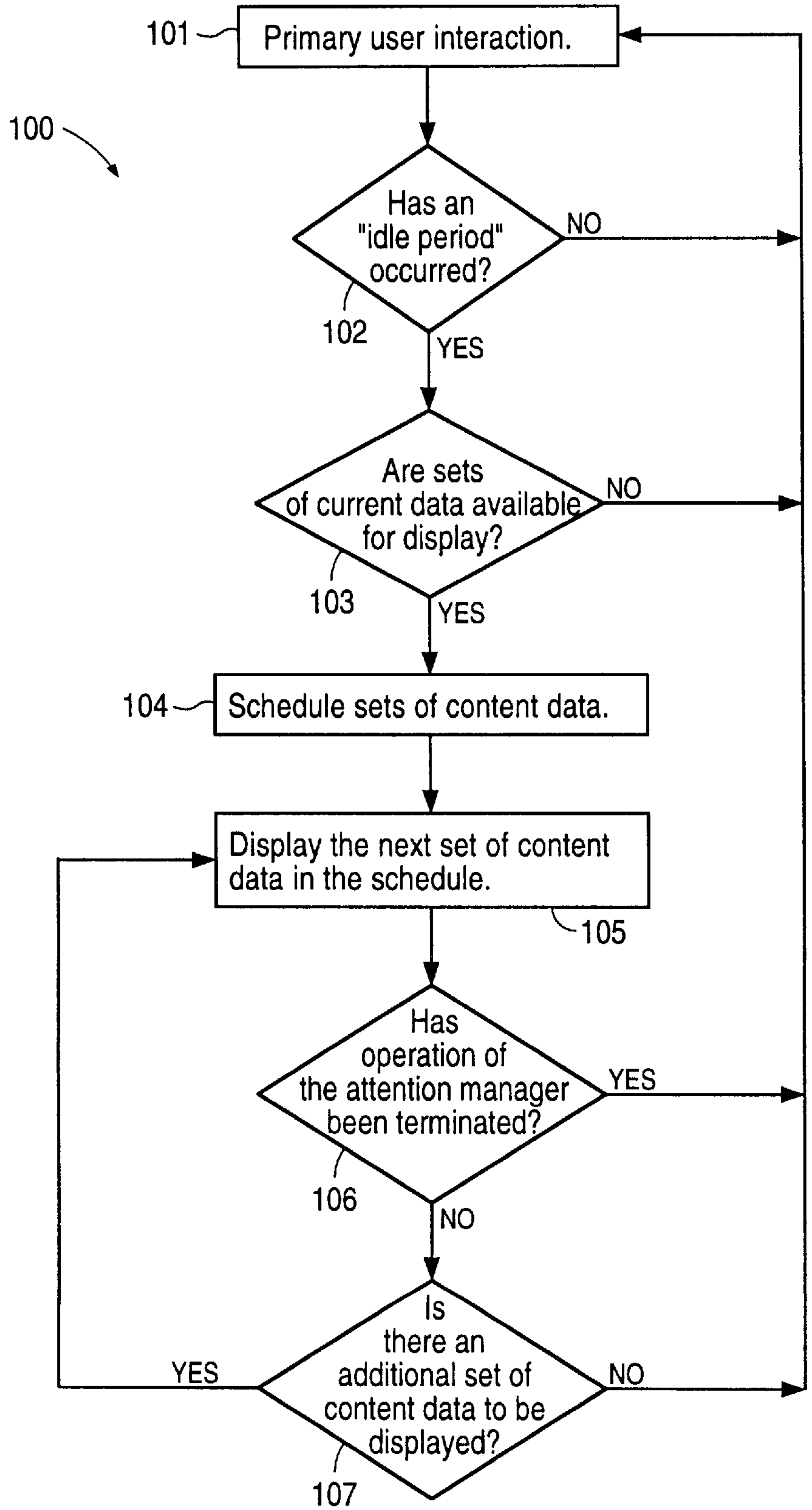
FIG. 1 is a flow chart of a method that implements an attention manager according to an embodiment of the invention.

According to the invention, an attention manager presents information to a person in the vicinity of a display device (or devices) in a manner that engages at least the peripheral attention of the person. "Display device", as used herein, encompasses any device that presents sensory stimulus to the person and includes, for example, computer video display devices, televisions and audio speakers. Further, here, "in the vicinity of" means any location with respect to the display device from which the person can perceive the information being presented. For example, if the information is being presented in a visual form, then "in the vicinity of" means any location from which the person can see the information. Or, if the information is being presented in an aural form, then "in the vicinity of" means any location from which the person can hear the information.

Often, the display device is part of a broader apparatus that can be utilized by a user for a primary interaction that is unrelated to the attention manager. (However, the attention manager can also be used with a display device that is not part of a broader apparatus, the user engaging in a primary interaction with the display device.) For example, the display device can be part of a computer that can be used to implement any of a number of application programs (e.g., word processing programs, computer games, spreadsheets, etc.). The person whose attention is engaged by the attention manager can be the user or another person in the vicinity of the display device. In one embodiment of the invention, the information is presented by the attention manager while a primary interaction is ongoing, but during inactive periods (i.e., when the user is not engaged in an intensive interaction with the apparatus). In another embodiment of the invention, the information is presented by the attention manager during active periods (i.e., when the user is engaged in an intensive interaction with the apparatus), but in an unobtrusive manner that does not distract the user from the primary interaction (e.g., the information is presented in areas of a display screen that are not used by displayed information associated with the primary interaction). Generally, then, an attention manager according to the invention makes use of "unused capacity" of a display device, "unused capacity" being defined broadly to include, for example, the embodiments mentioned above, i.e., both temporal (e.g., the first-described embodiment above) and spatial (e.g., the second-described embodiment above) dimensions.

The information is embodied by one or more sets of content data. Each set of content data is formulated by a content provider and made available by a corresponding content providing system for use with the attention manager. Each content providing system can provide more than one set of content data. Moreover, each set of content data can include one or more "clips", each clip being a definable portion of the set of content data that is used to generate a particular "image." The term "image" is used broadly here to mean any sensory stimulus that is produced from the set of content data, including, for example, visual imagery (e.g., moving or still pictures, text, or numerical information) and audio imagery (i.e., sounds). The content providing systems can also provide user interface tools that allow a user of the attention manager to specify that they want to obtain a particular set of content data. Once obtained, one or more images generated from the clips of one or more sets of content data are displayed by a content display system. The content display system integrates scheduling information associated with the sets of content data to produce a schedule according to which the images corresponding to the sets of content data are displayed for a particular user of the attention manager.

A set or sets of instructions for enabling a display device to selectively display images generated from one or more sets of content data are also made available to users of the attention manager. The instructions include application instructions, control instructions and content data acquisition instructions. Typically, the instructions enable images generated from content data to be displayed automatically, without user intervention, in a predetermined manner, thereby enhancing the capability of the attention manager to occupy the user's peripheral attention. Different sets of instructions can be formulated, such that only images generated from sets of content data that are compatible with a particular set of instructions can be displayed using that set of instructions. Typically, an application manager establishes a standard set or sets of instructions which content providers can tailor to fit their needs or desires.

As indicated above, the sets of content data represent sensory data, i.e., data that can be used to generate images as defined above. Typically, the sensory data is either video or audio data. The kinds of content data that can be used with the attention manager are virtually limitless. For example, video data that might be used as content data includes data that can be used to generate advertisements of interest to the user, moving and still video images which can be real-time or pre-recorded (e.g., nature scenes, pictures of family members, MTV music segments, or video from a camera monitoring a specified location, such as ski slopes or a traffic intersection, for conditions at that location), financial data (e.g., stock ticker information) or news summaries. Audio data that might be used as content data includes data that can be used to generate, for example, music or news programs (e.g., radio talk shows).

The attention manager according to the invention is useful both to users of the attention manager and to content providers. For users, the attention manager provides information to a user in which the user has expressed an interest. In particular, the attention manager provides information to a user that the user might not otherwise expend adequate energy to obtain. Additionally, the information is presented to the user in a manner that uses portions of the user's attention capacity that may otherwise be filled with extraneous information. Further, a variety of information can be displayed (i.e., images can be generated from more than one set of content data), so that the user does not have to choose particular information to the exclusion of all other information.

For content providers, the attention manager affords an opportunity to disseminate information to users that are interested in receiving such information, thus enabling the content providers to provide better directed information dissemination. Moreover, the attention manager provides access to the previously unused attention capacity of those interested users. Further, since information from more than one content provider can be displayed, content providers are more likely to have their information displayed, since their information is displayed in addition to, rather than instead of, the information of other content providers, thereby reducing the need to compete with other content providers for the attention of the user.

FIG. 1 is a flow chart of a method 100 that implements an attention manager according to an embodiment of the invention. The method 100 is performed by a content display system according to the invention. The content display system can be implemented, for example, using a digital computer that includes a display device and that is programmed to perform the functions of the method 100, as described below. Below, the method 100 is described as implemented on such a digital computer, though the method 100 could be implemented on other apparatus.

As shown by block 101, initially (i.e., before operation of the attention manager begins), a user is engaged in a primary user interaction, e.g., a primary user interaction with a computer. Though shown in FIG. 1, the primary user interaction of block 101 does not form part of the method 100 according to the invention. "Primary user interaction" is to be construed broadly and, generally, includes any operation of the computer (or other apparatus with which the user is engaging in an interaction) other than operation that is part of the attention manager according to the invention. When the user is interacting with a computer, the primary user interaction includes any operation of the computer that occurs to enable or to support the performance of the function or functions that provide the basis for the user's use of the computer. For example, the primary user interaction can be the use of any of a variety of conventional application programs (e.g., word processing programs, spreadsheet programs, personal finance programs, game programs, drawing programs, online services and Web browsers, among others). The primary user interaction can also be, for example, simply the operation of a conventional computer operating system, such as the Windows (e.g., Windows 3.1, Windows NT or Windows 95) or DOS operating systems produced by Microsoft Corp. of Redmond, Wash. or the MacIntosh operating system produced by Apple Computer, Inc. of Cupertino, Calif., among others. While, typically, the display device produces a display as a result of the primary user interaction, this need not necessarily be the case.

The method 100 actually begins with the block 102. In the step shown in the block 102 (referred to hereinafter as step 102), a determination is made as to whether an "idle period" has occurred. Generally, as used herein, "idle period" refers to a period of time of specified duration during which a specified condition does not occur. However, typically, the specified condition is one having the characteristic that failure of the condition to occur is indicative of an extended lack of intensive (or focused) interaction with the computer by the user ("user inactivity"). For example, the specified condition could be the lack of an input from an input device of the computer, e.g., the absence of striking a key on a keyboard, clicking a mouse, pressing on a touch-sensitive area of a touchscreen or issuing a voice command. Alternatively, the attention manager could be implemented with an apparatus that can monitor the environment of the apparatus (e.g., with a video camera) and evaluate the environment to ascertain that an "idle condition" (e.g., the viewing direction of the user of the apparatus is turned away from the apparatus by a specified amount for a specified period of time) has occurred, such idle condition triggering operation of the attention manager.

Theoretically, any duration of time can be specified to define the idle period. However, practically, the duration of time necessary to constitute an idle period cannot be so short that the attention manager begins operating at times that inhibit the user's primary interaction with the computer or that distract or annoy the user. Further, the duration of time chosen, as indicated above, should be sufficiently long to indicate an extended lack of interaction with the computer, suggesting that the user is not engaged in an interaction with the computer that the user would not want to have interrupted. However, the duration of time should not be so long that, for periods of user inactivity of a typical duration, the amount of time that the attention manager operates is undesirably short. In sum, choosing the duration of time that defines an idle period involves a balancing of the above considerations. Illustratively, the idle period can be defined as a period of between thirty seconds and two minutes during which the specified condition (e.g., user interaction with an input device) does not occur.

While detection of the idle period can be implemented in any suitable manner, one way in which such detection can be implemented is by monitoring an idle timer that is part of a screen saver API (application program interface) that is, in turn, part of an operating system used to operate the computer. Such screen saver APIs are commonly found in current operating systems such as the Windows or MacIntosh operating systems discussed above. The idle timer could be monitored and a signal that an idle period has occurred generated when the magnitude of the idle time as indicated by the idle timer reaches a predefined threshold.

Detection of an idle period as the basis for beginning operation of the attention manager is an indirect activation of the attention manager. In an alternative embodiment, step 102 of the method 100 is modified so that the attention manager is activated directly by the user. In other words, step 102 would consist of waiting for explicit direction from the user to begin operation of the attention manager. Such explicit direction could be enabled with an appropriate user interface, such as an on-screen icon or a menu selection, that is always present on the display screen of the display device as part of a standard interface that is provided by the operating system. Examples of such standard interfaces are the "Apple Menu" provided as part of the MacIntosh operating system, and the "Start Menu" or desktop icons provided as part of the Windows 95 operating system.

Returning to FIG. 1, if, in step 102, an idle period has not occurred, then the primary user interaction continues (block 101). The method 100 continues executing the step 102 at predefined time intervals (typically very short time intervals), thereby continually and frequently checking for the occurrence of an idle period.

If, in step 102, an idle period is detected, then, in the step shown in the block 103 (hereinafter referred to as step 103), a determination is made as to whether there are any sets of content data available for use in generating a display. (Hereinafter, reference is sometimes made to "displaying content data" or "displaying a set of content data"; it is to be understood that this means displaying images generated using the content data or set of content data.) Herein, "content data" refers to data that is used by the attention manager to generate displays (e.g., video images or sounds, or related sequences of video images or sounds). A "set of content data" refers to a related set of such data that is used to generate a particular display. A "clip" refers to a definable portion of a set of content data that is used to generate a particular image; a set of content data can include one or more clips and, therefore, can be used to generate one or more images. The acquisition of content data by the content display system is described in more detail below. Here, it is sufficient to note that, over time, an attention manager can acquire any number of sets of content data that can be displayed by the content display system.

If, in step 103, no sets of content data are available for display, then the primary user interaction continues (block 101). The method 100 continues executing the steps 102 and 103 at predefined time intervals, continually checking for the occurrence of an idle period and the acquisition of at least one set of content data.

If, in step 103, at least one set of content data is available for display, then, in the step shown in the block 104 (hereinafter referred to as step 104), the available sets of content data are scheduled for display by the content display system. (Alternatively, in other embodiments of the invention, scheduling of the sets of content data can occur before the method 100 begins. Such scheduling might be implemented, for example, so that each time a new set of content data is received by the content display system, the schedule is revised to include the new set of content data.) Typically, when the content display system acquires a new (or updated) set of content data, scheduling information for that set of content data is also acquired. Taken together, the scheduling information for all of the sets of content data is used to determine a schedule for display of the sets of content data by the content display system. Generally, determining a display schedule involves specifying the order in which the sets of content data are to be displayed and the duration of time for which each set of content data is to be displayed. The determination of the display schedule can also accommodate (to the extent possible) any special scheduling parameters for particular sets of content data (e.g., restrictions specifying when a particular set of content data must be displayed or cannot be displayed), mediating any conflicts between the display requirements of particular sets of content data. Often, though not necessarily, once the order and duration of display are established, the sets of content data are repetitively displayed by cycling through the display schedule repeatedly until operation of the attention manager is terminated. However, even where such iteration through the display schedule occurs, the display schedule can also accommodate scheduling parameters that delete sets of content data from the display schedule during particular iterations, thereby, for example, controlling the frequency with which particular sets of content data are displayed. The display schedule can be stored in an appropriately structured database, as known by those skilled in the art, that is stored in a memory of the computer used to implement the content display system.

Any appropriate set of rules, that can, for example, be arranged in any appropriate hierarchical manner, can be used for establishing a display schedule and, in particular, mediating conflicts between conflicting scheduling parameters associated with different sets of content data. For example, one rule for mediating conflicts may give preference to displaying sets of content data so that the sets of content data are displayed inversely to the order in which they were obtained by the content display system. This rule might be further specified so that a set of content data that has never previously been displayed by the attention manager is displayed prior to display of a set of content data that has been previously displayed, even though an update of the previously displayed set of content data has been obtained at a later time than that at which the never displayed set of content data was obtained. Another rule for mediating conflicts might resolve a conflict between two sets of content data having scheduling parameters that specify display at the same sequential position in the display schedule by randomly selecting one of the sets of content data to be displayed first during each iteration through the display schedule. Still another rule for mediating conflicts might establish a hierarchy of kinds of content data, with sets of content data of kinds at the top of the hierarchy being given preference for display over those at the bottom. Yet another rule or set of rules for mediating conflicts may involve performing some sort of analysis of the characteristics of the sets of content data that have been obtained by a particular content display system to ascertain preferences indicated thereby, and giving preference to sets of content data that are evaluated to be relatively more preferred. Scheduling rules of this kind would typically be part of the scheduling parameters provided independent of the content providers (i.e., in content display system scheduling instructions, as discussed elsewhere herein and, in particular, with respect to FIGS. 3A through 3C below).

Other scheduling rules, not directed to mediating conflicts between sets of content data, can also be used in determining a schedule. For example, any set of content data that has been initially obtained before a certain time and/or that has been last updated before a certain time (i.e., a set of content data that is "stale") can be automatically precluded from being inserted into the display schedule. This exclusion could further be restricted to apply only to certain sets of content data or content data of certain kinds. Similarly, the frequency with which a particular set of content data appears in a display schedule can be based upon how stale the set of content data is. Scheduling rules of this kind would typically be part of the scheduling parameters provided by a content provider for a set of content data (i.e., in tailored content data scheduling instructions, as discussed elsewhere herein and, in particular, with respect to FIGS. 3A through 3C below).

The particular scheduling rules used may be influenced by the characteristics of a particular embodiment of the attention manager, such as the available kinds of content data or the characteristics of the potential users of the attention manager. The particular scheduling rules used may also be influenced by the need or desire to simplify implementation of the scheduling rules.

Returning to FIG. 1, once the sets of content data have been scheduled for display, then, in the step shown in the block 105 (hereinafter referred to as step 105), a set of content data is displayed. The content display system is provided with one or more sets of display instructions to enable display of the set or sets of content data on the display device (as discussed elsewhere herein and, in particular, with respect to FIGS. 3A through 3C below).

After a set of content data has been displayed, then, in the step shown in the block 106 (hereinafter referred to as step 106), a determination is made as to whether operation of the attention manager has been terminated. Generally, operation of the attention manager can be terminated either directly or indirectly. Indirect termination of operation of the attention manager can be effected by, for example, causing operation of the attention manager to terminate when the specified condition (the non-occurrence of which is used to signal an idle period) occurs. For example, the attention manager can be terminated if the user makes an input to the computer using an input device, e.g., strikes a key on a keyboard, clicks a mouse, presses on a touch-sensitive area of a touchscreen or issues a voice command. For indirect termination, it may be desirable to add a further step or steps to the method 100 that, upon an indication that indirect termination should occur (e.g., the occurrence of the specified condition), asks the user to confirm that termination of the attention manager is, in fact, desired, and, if so, terminates the attention manager upon appropriate specified user input. In contrast to indirect termination, direct termination of operation of the attention manager can be effected by, for example, causing operation of the attention manager to terminate when the user selects a control option that specifies such termination, as described in more detail below with respect to FIGS 5A, 5B and 6.

If, in step 106, operation of the attention manager has been terminated, then the primary user interaction begins again (block 101). The method 100 then begins executing the step 102 again, checking for the occurrence of an idle period.

If, in step 106, operation of the attention manager has not been terminated, then, in the step shown in the block 107 (hereinafter referred to as step 107), a determination is made as to whether there is an additional set of content data to be displayed. Typically, in operation of an attention manager according to the invention, there will always be another set of content data to be displayed, since, as discussed above, the sets of content data in the display schedule are iteratively displayed until operation of the attention manager is terminated. However, this need not be the case. For example, a limit can be established on the number of times that each set of content data can be displayed, or on the total number of times that any set of content data is displayed.

If, in step 107, there are no additional sets of content data to be displayed, then the primary user interaction begins again (block 101). The method 100 then begins executing the step 102 again, checking for the occurrence of an idle period.

If, in step 107, there are additional sets of content data to be displayed, then the method 100 returns to the step 105 and displays a set of content data in accordance with the previously determined display schedule. Steps 105, 106 and 107 are continuously performed, resulting in the continuous display of sets of content data, until either the user terminates the attention manager (step 106) or there are no more sets of content data to be displayed (step 107).

In another embodiment of the invention, a step could be added to the method 100, either in place of or in addition to the step 107, or as part of the step 106, that causes operation of the attention manager to terminate after the attention manager has been operating for a specified period of time.

Further, in another embodiment of the invention, an appropriate step or steps could be added to the method 100 so that, at a specified time, such as after each iteration through the display schedule, the method 100 returns to the step 104 and re-determines the display schedule.

As described above, when the method 100 ends, the primary user interaction (block 101) begins again. Preferably, the primary user interaction begins again with the status existent at the time that the method 100 began. Thus, the primary user interaction must be held in abeyance while the method 100 is operating. This can be accomplished by implementing the method 100 (or any other embodiment of the attention manager) with a content display system that is implemented on a computer that operates with an operating system that allows "multi-tasking" (here used to mean either the suspension of one program while one or more other programs operate, or the execution of one program simultaneously with the execution of one or more other programs). The Windows and MacIntosh operating systems (mentioned above), among others, are operating systems having this characteristic. Where the attention manager is implemented using a screen saver API that is part of the operating system, such multitasking occurs automatically as a characteristic of the screen saver API, i.e., when operation of the attention manager ends, the user is returned to the status of the primary interaction existent at the time that the attention manager started operating. In multitasking operating systems that do not include a screen saver API, this feature of the invention can be implemented by use of an appropriately programmed device driver, as known by those skilled in the art, that monitors user interaction, suspending and restarting the primary user interaction at the beginning and end of operation of the attention manager.

The method 100 (FIG. 1) described above is an embodiment of the invention in which the attention manager presents information to a person (which can be the user or another person) in the vicinity of the display device during inactive periods when a user is not engaged in an intensive interaction with the computer (as indicated by the step 102 which checks for the occurrence of an "idle period" before beginning operation of the attention manager). As indicated above, in other embodiments of the invention, the attention manager presents information to the person during active periods, but in an unobtrusive manner. In such embodiments, video content data could be presented, for example, as "wallpaper" on the display screen of a video display monitor. Audio content data according to these embodiments could be presented in the same way as for the embodiments of the method 100 described above. For implementation of such embodiments of the invention, the step 102 of the method 100 could be modified to be a determination as to whether the attention manager has been activated (typically this would require direct activation by the user). Alternatively, step 102 could be eliminated altogether and the attention manager could be implemented to operate at any time that the computer is operating and sets of content data are available for display (step 103). For these embodiments, it is, as above, necessary that the content display system be implemented on a computer operated by an operating system that allows multi-tasking as described above. In particular, simultaneous operation of programs must be allowed, since the attention manager operates while the primary user interaction is ongoing (note that the relationships between the block 101 and the method 100 shown in FIG. 1 are not present in these embodiments of the invention).

Though not confined to such use, the attention manager according to the invention is envisioned as having particular use as a system implemented on, and used by, a network of computers. In such an implementation, each content providing system is implemented on a content provider computer. (It is possible to have more than one content providing system on a content provider computer.) Content display systems are implemented on user computers. The content provider computers and user computers are integrated together into a network such that each user computer can communicate with one or more of the content provider computers. The content provider computers need not (and typically would not) communicate with each other. Likewise, the user computers need not (and typically would not) communicate with each other. Further, each user computer need not communicate with all, or even more than one, of the content provider computers. For example, an attention manager according to the invention could be implemented so as to make use of a network such as the Internet. In particular, the graphical attributes of the World Wide Web would be particularly useful in enabling the provision of user interfaces that allow users to access the attention manager while visiting network sites of content providing systems.

Figure 2:
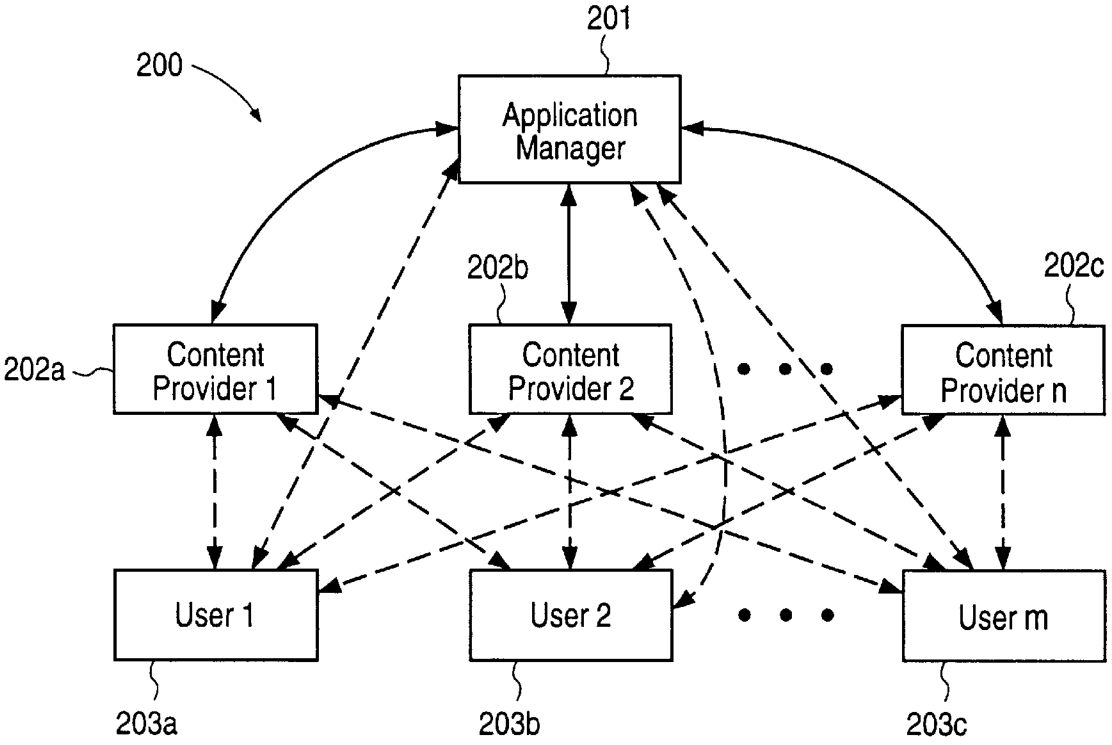
FIG. 2 is a block diagram of a system for implementing an attention manager according to an embodiment of the invention.

FIG. 2 is a block diagram of a system 200 for implementing an attention manager according to an embodiment of the invention. The system 200 includes an application manager 201, a multiplicity of content providing systems, shown as Content Providers 1 through n (content providing systems 202*a*, 202*b* and 202*c* are illustrated in FIG. 2), and a multiplicity of content display systems, shown as Users 1 through n (content display systems 203*a*, 203*b* and 203*c* are illustrated in FIG. 2). Hereinafter, the content providing systems and content display systems are referred to generally using the numerals 202 and 203, respectively. In FIG. 2, the solid lines indicate that communication must occur in the system 200 and the dashed lines indicate that communication may occur. However, note that, in another embodiment of the invention, the application manager 201 is not present, and communication between any particular content display system and particular content providing system need not necessarily occur.

The application manager 201, content providing systems 202 and content display systems 203 can be implemented using appropriately programmed digital computers. Generally, the computers can be any conventional digital computers including an input device (such as a keyboard, mouse or touch screen), an output device (such as a conventional computer display monitor and/or one or more audio speakers), a processing device (such as a conventional microprocessor), a memory (such as a hard disk and/or random access memory), additional conventional devices necessary to interconnect and enable communication between the above-listed devices, and communications devices (e.g., a modem) for enabling communication with other computers of the system. For example, the application manager 201 and content providing systems 202 can be implemented using conventional server computers, while the content display systems 203 can be implemented using conventional client computers. The application manager 201, content providing system 202 and content display systems 203 could also themselves each be implemented by a client-server network of computers. Communication between the computers can be accomplished using any appropriate communication transmission lines, such as conventional telephone lines, or high speed data transmission systems such as T1, T3 or ISDN. The communication can be managed using any appropriate conventional networking methods (e.g., computer programs and protocols) and apparatus, as known by those skilled in the art. In particular, as described further below, the computers are programmed to enable the content display systems 203 to communicate with the content providing systems 202 and application manager 201 even without direct action by the user. In addition to being programmed to enable networking, each of the computers is also appropriately programmed, as described above and below, to perform the functions of the application manager 201, content providing systems 202 and content display systems 203, as appropriate.

Figure 3A:
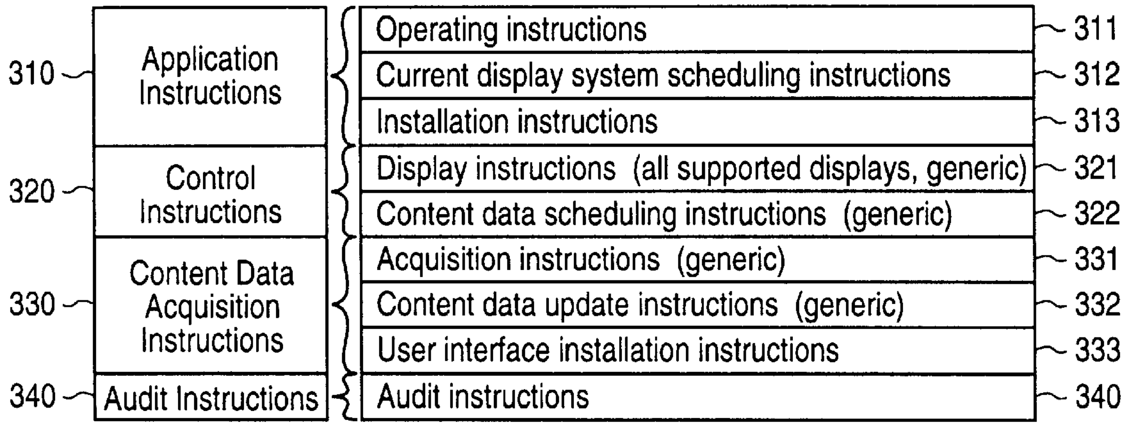
FIGS. 3A, 3B and 3C are schematic diagrams illustrating the functional components of an application manager, a content providing system and a content display system, respectively, according to an embodiment of the invention.
Figure 3B:
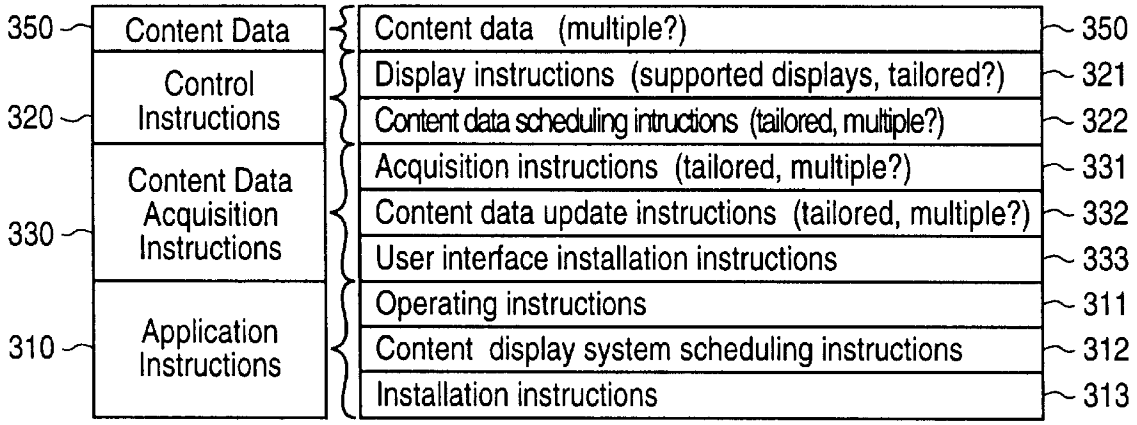
Figure 3C:
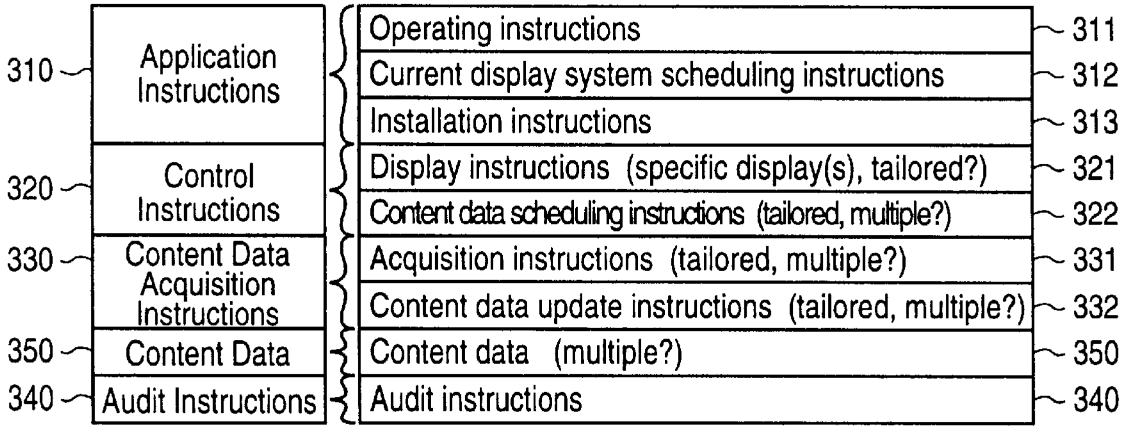

FIGS. 3A, 3B and 3C are schematic diagrams illustrating the functional components of the application manager 201, a content providing system 202 and a content display system 203, respectively, according to an embodiment of the invention. Each of the functional components are represented by a set of instructions and/or data. (In particular, each of the sets of instructions may include, if appropriate, data related to accomplishment of the functions associated with the set of instructions; similarly, a set of content data may include, if appropriate, instructions that enable generation of an image from the set of content data.) Each of these sets of instructions and/or data can be embodied in an appropriate computer program or set of computer instructions (the latter capable of including computer instructions and data), or an appropriate set of data configured for use by a set or sets of instructions (e.g., computer program) that must interact with the set of data in order to implement the attention manager.

The application manager 201 stores a variety of instructions for use in implementing the attention manager. As shown in FIG. 3A, generally, the application manager 201 stores application instructions 310, control instructions 320, and content data acquisition instructions 330 that can be disseminated to the content display systems 203 and content providing systems 202 as necessary or appropriate. The application manager 201 can also store audit instructions 340 that can be used to enable monitoring of usage of the attention manager.

The application instructions 310 include operating instructions 311 for beginning, managing and terminating operation of the attention manager on a content display system 203, and content display system scheduling instructions 312 for scheduling the display of content data on a content display system 203. The method 100 (FIG. 1) described above is one embodiment of such application instructions 310. The application instructions 310 also include installation instructions 313 that enable the other instructions used by the attention manager to be implemented using the hardware that is part of and associated with a particular content display system 203. The installation instructions 313 can be implemented as known by those skilled in the art. For example, the installation instructions 313 can be a "plug-in" or "helper" application program (such as a helper application that can be used with the Navigator and Mosaic software programs made by Netscape Communications Corp. of Mountain View, Calif.) that is used to process instructions or data of a particular type—in this case, instructions to implement the attention manager, and content data for use with the attention manager, that can be installed on the hardware of a particular content display system 203. There can be a multiplicity of such helper applications, each capable of operating on particular hardware that could be used to implement a content display system 203. The helper application enables the software program (i.e., Navigator or Mosaic) being used to access the sites of content providers to process references (e.g., Universal Resource Locators, or "URLs") to the particular type of instructions and/or data, so that sets of content data (including updated sets of content data) and the application instructions 310, control instructions 320 and content data acquisition instructions 330 (including updated versions of those instructions) can be acquired.

The control instructions 320 include display instructions 321 and content data scheduling instructions 322, as described in more detail below, that are typically enhanced by content providers in a particular manner that is appropriate for the content data that the content providers provide. The application manager 201 can (and typically does) store and disseminate multiple distinct sets of control instructions 320. Generally, the display instructions 321 of a particular set of control instructions 320 enable display of content data on a particular type of display device (e.g., a particular type of computer video display or a particular type of audio speaker) or display of a particular type of content data. Display instructions 321 that can be used with a particular display device are typically already developed by third parties (e.g., the maker of the display device) and are readily available. Tailoring of the display instructions 321 to display particular types of content data (such as instructions for displaying content data that is in the GIF format or the format of AutoDesk Animator FLC files) can be done by either the application manager 201 or a content provider. The content data scheduling instructions 322 provide temporal constraints on the display of particular sets of content data. As stored by the application manager 201, the content data scheduling instructions 322 are usually the same for each set of control instructions 320 and provide a generic set of scheduling instructions that can be tailored by a content provider.

The content data acquisition instructions 330 include acquisition instructions 331 for enabling the initial acquisition of a set of content data and instructions for implementing the attention manager, and content data update instructions 332 for enabling update of previously obtained sets of content data and attention manager instructions. The acquisition instructions 331 and content data update instructions 332 are generic sets of instructions that can be tailored by a content provider. The content data acquisition instructions 330 can also include user interface installation instructions 333 that enable content providers to install a user interface in the information environment (e.g., Web page) of the content provider so that users can request sets of content data from the content provider. Such user interface installation instructions are conventional and readily available for use with the attention manager of the invention.

As shown in FIG. 3B, the content providing systems 202 store one or more sets of content data 350 that can be disseminated to content display systems 203 as requested. The content providing systems 202 can also store the application instructions 310, control instructions 320, and content data acquisition instructions 330 described above.

As indicated above, each set of content data 350 defines a related group of data that is used to generate a particular display and includes one or more clips that each represent a definable portion of the set of content data that is used to generate a particular image. The content data 350 represents sensory data and can be, for example, video or audio data. A particular set of content data 350 can be formulated in different versions that are each compatible with content display systems 203 having particular characteristics. In particular, the characteristics of the display device of a content display system 203 can affect the formulation of a set of content data 350. For example, for computer video display monitors, the formulation of a version of a set of content data 350 can depend on the size of the display screen (e.g., horizontal length by vertical length), the display resolution (e.g., the number of horizontal pixels by the number of vertical pixels), the color depth (number, e.g., 256, of possible colors) and the characteristics of the display drivers for the display device. The formulation of a version of a set of content data 350 could also depend upon the operating system being used by the computer on which the content display system 203 is implemented or other characteristics of the computer, such as the speed with which the display device can be operated (insofar as that speed is affected by the characteristics of the computer such as processor speed). Generally, a set of content data 350 can be formatted as known by those skilled in the art in view of the above considerations.

As indicated above, the control instructions 320 (as well as the content data acquisition instructions 330) are typically enhanced by content providers as appropriate for particular content data. The manner in which these instructions can be tailored by content providers is desirably required to conform to a specified format. Below, a description is given of package files that can be used for tailoring the control instructions 320 and content data acquisition instructions 330, as well identifying the location of content data. These package files can be created using an appropriate computer program (package file editor) that can be provided by, for example, the application manager 201 and that enables this tailoring to be accomplished easily and according to the specified format.

The content provider can tailor the content data scheduling instructions 322 to indicate the duration of time that a particular set of content data can be displayed ("duration instructions"). Generally, the duration instructions can be arbitrarily complex and can vary in accordance with a variety of factors, including, for example, the particular time at which the set of content data 350 is displayed after the attention manager begins operating, or the number of previous times that the set of content data 350 has been displayed during a continuous operation of the attention manager. The content provider can also tailor the content data scheduling instructions 322 to indicate an order in which the clips of a set of content data 350 are displayed, as well as the duration of the display for each clip ("sequencing instructions"). The content provider can also tailor the content data scheduling instructions 322 to indicate particular times or ranges of times at which a set of content data 350 can or cannot be displayed ("timing instructions") These times can be absolute (e.g., a particular clock time on a particular day, a particular day or days during a week, after or before a specified date) or relative (e.g., not before or after a specified duration of time since the attention manager began operation, first or not first among the sets of content data 350 to be displayed, not after a particular kind or set of content data 350). The content provider can also tailor the content data scheduling instructions 322 to specify a maximum number of times that the set of content data 350 can be displayed after the attention manager begins operating or a maximum number of times that the set of content data 350 can be displayed over any number of operations of the attention manager ("saturation instructions").

The content provider can also tailor the display instructions 321 to display a particular set or sets of content data. The display instructions 321 can be tailored, for example, according to the type or types of the content data. The type of content data indicates the manner in which an image or images are generated from the content data (i.e., how the bit patterns in a particular clip are transformed into an image). The type of content data is typically established as a consequence of the manner (e.g., with a particular software application program such as the Photoshop or Premiere programs produced by Adobe Systems of Mountain View, Calif.) in which a particular clip is created. The installation instructions 313, discussed above, enable content data of different types to be obtained by the attention manager. Generally, the possible types of content data can be confined to an enumerated set of standard data types, such as the Mime data types used with the World Wide Web. As will be more readily understood from the description below, the type of content data can be specified, for example, in a field of the clip part of a package file.

The ability to tailor sets of content data 350 and associated control instructions 320 for particular content display systems 203, before the sets of content data 350 and control instructions 320 are provided to those content display systems 203, is advantageous because it allows the tailoring to be done once, by the content providing system 202 or the application manager 201, rather than multiple times, once by each content display system 203 that uses the set of content data 350 and associated control instructions 320.

The content data acquisition instructions 330—in particular, the content data update instructions 332—are also tailored by content providers as appropriate for particular sets of content data 350. In particular, the content provider can tailor the content data acquisition instructions 330 to indicate where and when to obtain an updated set of content data 350. For example, the indication of where to obtain an updated set of content data 350 can be accomplished by specifying an appropriate network address of a content providing system 202. The network addresses can be specified by, for example, a URL used to identify, for example, an HTML file, an applet (a short application program written in Java or other suitable programming language), a script based on CGI or other suitable mechanism, or any other resource (i.e., computer program or set of data). The indication of when to obtain an updated set of content data 350 can be accomplished by specifying a time or times, either absolute time or times (i.e., particular dates and times during the day) or relative time or times (e.g., one month after the last acquisition/update of the set of content data 350). For example, the update schedule could be established to obtain updates every hour, every day or every week. Or, the update schedule could be established to obtain updates upon the occurrence of a particular event, such as a specified percentage increase or decrease in a stock market index. In general, the particular update schedule used will depend upon the character of the content data with which the update schedule is associated, e.g., content data representing stock prices would probably be updated more frequently than content data representing an advertisement.

As shown in FIG. 3C, the content display systems 203 store the application instructions 310, control instructions 320, and content data acquisition instructions 330 described above. The application instructions 310 use the control instructions 320 to display sets of content data 350 that are obtained (and updated, if appropriate) by the content data acquisition instructions 330. The application instructions 310 and control instructions 320 are discussed generally, and with respect to particular embodiments, in more detail above, while an embodiment of the content data acquisition instructions 330 is described below.

Figure 4:
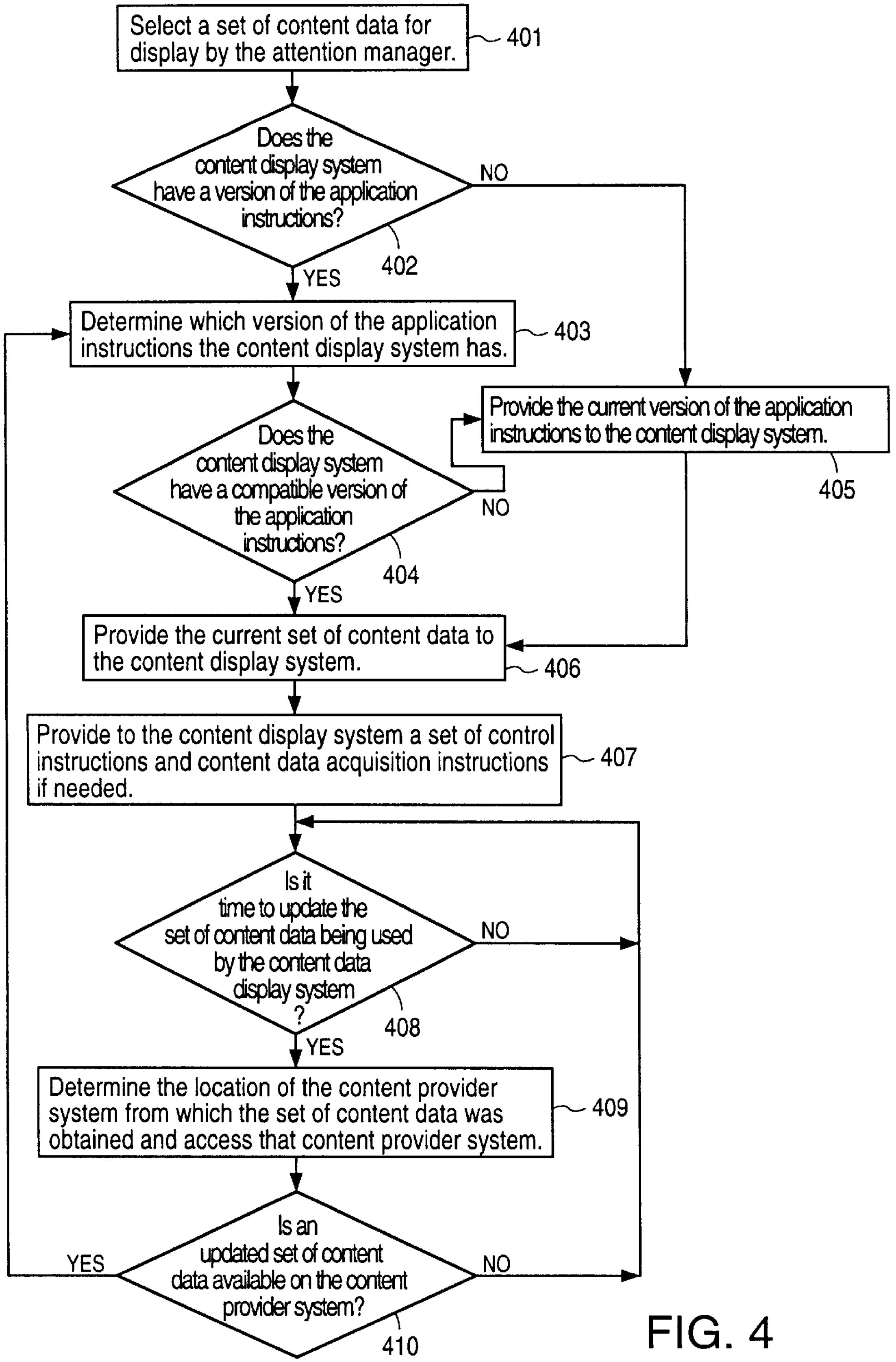
FIG. 4 is a flow chart of a method, according to an embodiment of the invention, for acquiring and updating sets of content data.

FIG. 4 is a flow chart of a method 400 according to the invention for acquiring and updating sets of content data, i.e., the method 400 is an embodiment, at least in part, of the acquisition instructions 331 and content data update instructions 332 of the content data acquisition instructions 330 discussed above with respect to FIGS. 3A through 3C. In the method 400, the steps shown by blocks 402 through 407 can be implemented in the acquisition instructions 331 and the steps shown by blocks 403 through 410 can be implemented in the content data update instructions 332. Generally, the steps of the method 400 can be implemented on an appropriately programmed digital computer that is programmed to perform the functions of the method 400, as described below. Below, the method 400 is described as implemented on such a digital computer, though the method 400 is not limited to such an implementation. The method 400 necessitates communication between a content display system 203 and one or more content providing systems 202. As will be understood by those skilled in the art of digital computer programming for computer network communications, when the method 400 is implemented using a programmed digital computer, particular steps of the method 400 could be implemented on either a content display system 203 or a content providing system 202.

In the step shown in the block 401 (referred to hereinafter as step 401), a set of content data is selected for display by the attention manager. Initially, in step 401, particular sets of content data are obtained as a result of direct request by the user. Any appropriate user interface can be used for enabling a user to directly request a particular set of content data. For example, Web pages on the World Wide Web could include graphical buttons for enabling users that visit the Web page to request particular sets of content data. Selection of a button on a Web page results in an indication to the appropriate content providing system 202 that the requesting content display system 203 has requested the set of content data corresponding to the selected button to be transferred to the content display system 203. The user interface instructions 333 discussed above, that can be provided to each content providing system 202, can be used to create the user interface.

Selection of a set of content data in step 401 causes a set of acquisition instructions 331 to be transferred to the content display system 203. The acquisition instructions 331 include information identifying the site from which the set of content data can be obtained, as well as the site or sites from which instructions (e.g., application instructions 310, control instructions 320, content data acquisition instructions 330 and audit instructions 340) for implementing the attention manager can be obtained. These sites can be the same or different sites. The sites can be identified by, for example, using URLs, as described above. The acquisition instructions 331 can also include instructions for establishing an appropriate user interface (e.g., a desktop icon) in the content display system 203 that enables a user to cause the installation instructions 313 to be executed, thereby installing the attention manager in the content display system 203.

In the step shown in the block 402 (referred to hereinafter as step 402), a determination is made as to whether the requesting content display system 203 has the application instructions 310 (FIGS. 3A through 3C) that enable operation of the attention manager and scheduling of sets of content data 350. If the content display system 203 does not have the application instructions 310, then, in the step shown in the block 405 (referred to hereinafter as step 405), the content display system 203 uses the appropriate site identification provided by the content providing system 202 to obtain a version of the application instructions 310 (typically the most current version of the application instructions 310 that is compatible with the set of content data 350 requested by the user). The application instructions 310 can be provided by the content providing system 202 from which the set of content data 350 is being obtained. Alternatively, the application instructions 310 can be provided directly to the content display system 203 by the application manager 201 (or from some site other than a content provider or the application manager 201) by causing an appropriate instruction to be issued to the application manager 201 (or other site) by either the content providing system 202 or the content display system 203.

If the content display system 203 does have the application instructions 310 (step 402), then, in the step shown in the block 403 (referred to hereinafter as step 403), a determination is made as to which version or versions of the application instructions 310 the content display system 203 has. As indicated elsewhere, a particular set of content data 350 can (and typically will) be updated from time to time, thereby creating different versions of the set of content data 350. Likewise, the application instructions 310 can also be updated, thereby creating different versions of the application instructions 310. In general, a set of content data 350 can be updated without regard to whether the set of content data is compatible with all versions of the application instructions 310 (though the set of content data 350 must be compatible with at least one version of the application instructions 310). Likewise, the application instructions 310 can be updated without regard to whether any particular set of content data 350 is compatible with that version of the application instructions 310. Moreover, particular versions of the application instructions 310 may be compatible only with sets of content data 350 of certain types. Consequently, a particular content display system 203, even though the content display system 203 has the application instructions 310, may not have a version of the application instructions 310 that is compatible with the type and/or version of the set of content data 350 being requested.

It is necessary, therefore, to determine whether the content display system 203 has a version of the application instructions 310 that is compatible with the type and version of the set of content data 350 being requested so that, if necessary, a compatible set of application instructions 310 can be provided to the content display system 203. In the step shown in the block 404 (referred to hereinafter as step 404), this determination is made. If the content display system 203 does not have a compatible version of the application instructions 310, then, in step 405, the content providing system 202 (or, for example, the application manager 201) provides to the content display system 203 a version of the application instructions 310 (typically the most current version) that is compatible with the requested set of content data 350.

Alternatively, in step 404, a determination could be made as to whether the version of the application instructions 310 that the content display system 203 has is the most current version of a set of compatible application instructions 310. If the version is not the current version, then the content providing system 202 provides the current version (step 405), even if the version that the content display system 202 already had is compatible with the newly acquired set of content data 350.

Preferably, updated sets of application instructions 310 are made downwardly compatible with previous sets of application instructions 310, so that the updated application instructions 310 can be used with any previously obtained sets of content data that are compatible with a previous set of application instructions 310. If downward compatibility is not maintained, the updated set of application instructions 310 can replace a previous set of application instructions 310 and incompatible sets of content data can be removed from the schedule of sets of content data to be displayed (this can be accomplished by the use of appropriate instructions in the content display system scheduling instructions 312 that check for the compatibility of sets of content data with the existing set of application instructions 310) when the attention manager is operating. The content data update instructions 332 can also include instructions that ascertain the current version of the application instructions 310 and, for each set of content data 350 that is incompatible with the current version of the application instructions 310, seek to obtain, at the time scheduled for an update, an updated set of content data 350 that is compatible with the current version of the application instructions 310.

The steps 402 through 405 are advantageous in that they result in the provision of application instructions 310 to a content display system 203 only when such instructions are needed, thus minimizing the number of sets of application instructions that are made available. The steps 402 through 405 also minimize the amount of information that must be transmitted over communication lines to the content display system 203, thereby freeing those lines for other communication and minimizing the cost (i.e., cost of using the communication lines) associated with using the attention manager of the invention.

Returning to FIG. 4, in the step shown in the block 406 (referred to hereinafter as step 406), the content providing system 202 provides the current set of content data 350 to the content display system 203. (In practice, the set of content data 350 can be provided before, after or simultaneously with provision of the application instructions 310.)

Further, as described above, a particular set of content data 350 can exist in different versions that are each compatible with the content display system 203 to which the version of the set of content data 350 is being provided. The step 406 can include a determination as to the version or versions of the set of content data 350 that can be used by the requesting content display system 203, so that a properly formulated set of content data 350 is acquired.

A set of control instructions 320 and content data acquisition instructions 330 (FIGS. 3A through 3C) associated with the set of content data 350 can also be provided, as shown by the step of block 407 (referred to hereinafter as step 407). Typically, a check is made (like that for the application instructions 310 and providing similar benefits) to determine whether the content display system 203 already has a compatible (and/or current) version of the control instructions 320 and/or the content data acquisition instructions 330 associated with the set of content data 350 being obtained.

Each set of content obtained by a content display system 203 can be stored in a database (having any suitable structure) that is stored in a memory of the computer used to implement the content display system 203. The database can also store other information associated with each set of content data 350. This information is discussed in more detail below in the discussion of package files which can be used to convey such information from the content providing systems 202 to the content display systems 203. The package file editor mentioned above can be provided to each content providing system 202 to enable the content provider to easily create a package file for each set of content data 350 provided by that content provider.

Each package file includes a reference to the set of content data 350 (e.g., a network address) to which that package file corresponds. As mentioned above, each package file can also include a variety of other information. For example, the package file can include a specification of the format of the content data 350 (i.e., an indication of the types of content display systems 203 with which the set of content data 350 is compatible) and the type of the content data (e.g., an identification of a particular graphical format, as discussed above). (This information might be specified explicitly or implicitly; alternatively, this information may be passed to the content display system 203 separately from the package file.) The package file can additionally include a text description of the contents of the package file (this could be used, for example, in a user interface that lists descriptions of all of the sets of content data available to a content display system 203 or provided by a content providing system 202). The package file can also include information governing the presentation of the set of content data, such as screen position, special animation effects and display duration (the latter is shown by the View-Time attribute in the Example below). The update information (location and schedule) is also included in the package file. The package file can also include linking information (e.g., network address of an information source) used to implement a link option discussed in more detail below. The content data scheduling information discussed above can also be included in the package file. The package file can also include data structures that can be used to store auditing information, as discussed in more detail below. The package file can also include reference to one or more sets of control instructions 320, each set of control instructions 320 enabling display of the set of content data 350 by a content display system 203 having a particular architecture, or enabling display of clips of particular types.

The following Example illustrates how a package file for use with the invention could be constructed. The package file of this Example does not include all types of information that could be included in a package file; it is to be understood that other types of information (as discussed above, for example) could be included in such a package file, expressed in a similar manner to that shown in the Example. In this illustration, the package file is constructed in an object-oriented manner. Generally, each statement in the package file conforms to the following syntax:

keyword{attribute:value (1) . . . attribute:value(n)} where "keyword" can be either PACKAGE or CLIP, "attribute" identifies one of the types of information discussed immediately above, and "value" is an identification of particular content for the type of information. There can be any number of "attribute:value" pairs in a statement. In the Example, each attribute:value pair is designated at right by a numeral enclosed in parentheses to aid in the description; this numeral does not form part of the package file shown in the Example.

Example

| | | |
|---|---|---|
| PACKAGE { | Object-Id: 1 | (1) |
| | Object-Type: 1 | (2) |
| | Source: http://iwww.interval.com/¯freiberg/ Netscreen/Bookreviews/reviews.nss | (3) |
| | Name: Book Reviews: Day 1 | (4) |
| | Description: | (5) |
| | Update Frequency: 720 | (6) |
| } | | |
| CLIP { | Object-Id: 16919316 | (7) |
| | Object-Type: 2 | (8) |
| | Source: http://iwww.interval.com/¯freiberg/ Netscreen/Bookreviews/1%20Day%20Book/ bookreview-1-a1.gif | (9) |
| | Name: Anger | (10) |
| | Description: Book Review | (11) |
| | Update-Frequency: 0 | (12) |
| | View-Time: 15 | (13) |
| | Followup-URL: http://www.randomhouse.com/ knopf/ | (14) |
| | Linked-To-Following: 1 | (15) |
| } | | |
| CLIP { | Object-Id: 16919384 | (16) |
| | Object-Type: 2 | (17) |
| | Source: http://iwww.interva1.com/¯freiberg/ Netscreen/Bookreviews/1%20Day%20Book/ bookreview-1-a2.gif | (18) |
| | Name: Emotional Intelligence | (19) |
| | Description: | (20) |
| | Update-Frequency: 0 | (21) |
| | View-Time: 15 | (22) |
| | Followup-URL: http://www.randomhouse.com/ knopf/ | (23) |
| | Linked-To-Following: 0 | (24) |
| } | | |

The first part of line 1 indicates that the following describes a package file. The remainder of line 1 and line 2 are used in debugging and are not relevant to the invention. Line 3 specifies a network address that identifies the location of the package file. (Note that the type of the package file is suggested in line 3 by the file extension .nss, though this extension is not necessary to specify the type. This extension can be used to implicitly specify the type of the package file to the content display system 203.) Lines 4 and 5 each give a description of the contents of the package file that can be used, for example, in a user interface to identify the package file. Line 6 specifies the frequency of acquisition of updates to the set of content data 350 and related instructions that are described by the package file. (In this Example, the frequency is specified in minutes.) The first part of line 7 indicates that the following describes a clip in the package file. The remainder of line 7 and line 8 are similar to lines 1 and 2. Line 9 specifies a network address that identifies the location of the clip. (Similarly to line 3, the type of the clip is suggested in line 9 by the file extension .gif, though, again, this extension is not necessary to specify the type.) Lines 10, 11 and 12 are similar to lines 4, 5 and 6. (Note that, in line 12, the specification of "0" for the update frequency indicates that the clip is never updated.) Line 13 specifies the duration of display for this clip. (In this Example, the duration is specified in seconds.) Line 14 specifies a network address of an information source to which a link can be established during display of this clip. (This aspect of the invention is described in more detail below with respect to the "more" option 602*d* of FIG. 6.) Line 15 specifies the number of additional clips that are part of this package file. Lines 16 through 24 are similar to lines 7 through 15.

When a content display system 203 receives a new package file from a content providing system 202, the content display system 203 first determines whether the contents of a corresponding package file (i.e., either the same package file or an earlier version of the package file) already exist as part of the database. This can be done by scanning a list of entries in the database that each indicate the presence of the contents of a particular package file. If the contents of a corresponding package file are not present, then a new entry is created in the list and the contents of the new package file are stored as part of the database (in accordance with the structure of the database). As part of the process of storing the contents of the package file, the contents are transformed into a form that is compatible with the architecture of the content display system 203 (this is enabled by the installation instructions 313 discussed above.

As described above, the database of content data and related information is constructed from a package file that can have a particular format, as illustrated in the Example above. However, generally, such a database can be constructed from files having any format (e.g., an ASCII file) that enables specification of the information described above that a package file includes.

Returning to FIG. 4, as indicated above, when a set of content data 350 is obtained (step 406), corresponding control instructions 320 and content data acquisition instructions 330 are also obtained (step 407) if such instructions have not already been acquired by the content display system 203. In particular, content data update instructions 332 can be obtained, so that updates to the set of content data 350 and/or the associated control instructions 320 and content data acquisition instructions 330 can be obtained in the future. As mentioned above, the content data update instructions 332 include a description of the location of the content providing system 202 from which the updates can be obtained as well a schedule of times at which such updates should be obtained.

In the step shown in the block 408 (referred to hereinafter as step 408), a determination is made as to whether it is time to update the set of content data 350. The update schedule discussed above is used for this purpose. As long as the schedule indicates that no update need be obtained, the method 400 continues executing the step 408, thereby continuously monitoring whether an update need be obtained. The monitoring of step 408 could be implemented, for example, by a procedure that monitors the content display system computer clock and indicates that an update should be obtained when the clock time is equal to a time in the update schedule.

The update schedule can be established according to any desired criteria. For example, preferably, though not necessarily, the step 408 (and the steps 409 and 410 discussed below and, as necessary, the steps 403 through 407 discussed above) of the method 400 operates at any time that the computer (or computers) with which the content display system 203 is implemented is on, even when the attention manager is not operating. Thus, the update schedule could be established so that updates are obtained during the middle of the night, when charges for communication with content providing systems 202 are cheaper. Preferably, then, at least this part of the content display system 203 is implemented on a computer that is always on, so that such cheap communications time can be utilized for obtaining updates. This can be particularly feasible if the content display system 203 is implemented on a client-server network in which at least the content data update instructions 332 are executed by a server computer which remains on at all times. If, however, the computer on which the content data update instructions 332 are executed is turned off at a time when an update is scheduled to be retrieved, then the update can occur immediately after the next time that the computer is turned on.

This aspect of the content data acquisition instructions 332 can be implemented, for example, using a communications daemon that is part of the content data update instructions 332. When the content data update instructions 332 are acquired by a content display system 203, the daemon is inserted into a startup file that is executed at the beginning of operation of the operating system of the computer with which the content display system 203 is associated. The daemon causes a connection to be made to each location from which the content data update instructions 332 indicate that an update is to be acquired. For example, if the computer uses a Windows operating system, the daemon initiates a WinSock TCP/IP connection to enable connection to be made to the locations of the updated sets of content data 350.

Returning to FIG. 4, once it is determined that an update of the set of content data 350 should be obtained, then, in the step shown in the block 409 (referred to hereinafter as step 409), the location of the appropriate content providing system 202 is ascertained from the scheduling information, and that location is accessed.

In the step shown in the block 410 (referred to hereinafter as step 410), a determination is made as to whether an updated set of content data 350 is available on the content providing system 202. If an updated set of content data 350 is not available, then the step 408 begins executing again, continuing until the update schedule indicates that it is again time to check for an updated set of content data 350. If an updated set of content data 350 is available, then the method 400 returns to the step 403, and an updated set of content data 350 and, if necessary, related control instructions 320 and content data acquisition instructions 330 are provided to the content display system 203 (i.e., an appropriate package file is provided to the content display system 203). As discussed above, the content display system 203 compares the version of the package file contents stored in the database to the contents of the version of the package file being newly provided, and makes changes to the database as necessary.

Figure 5A:
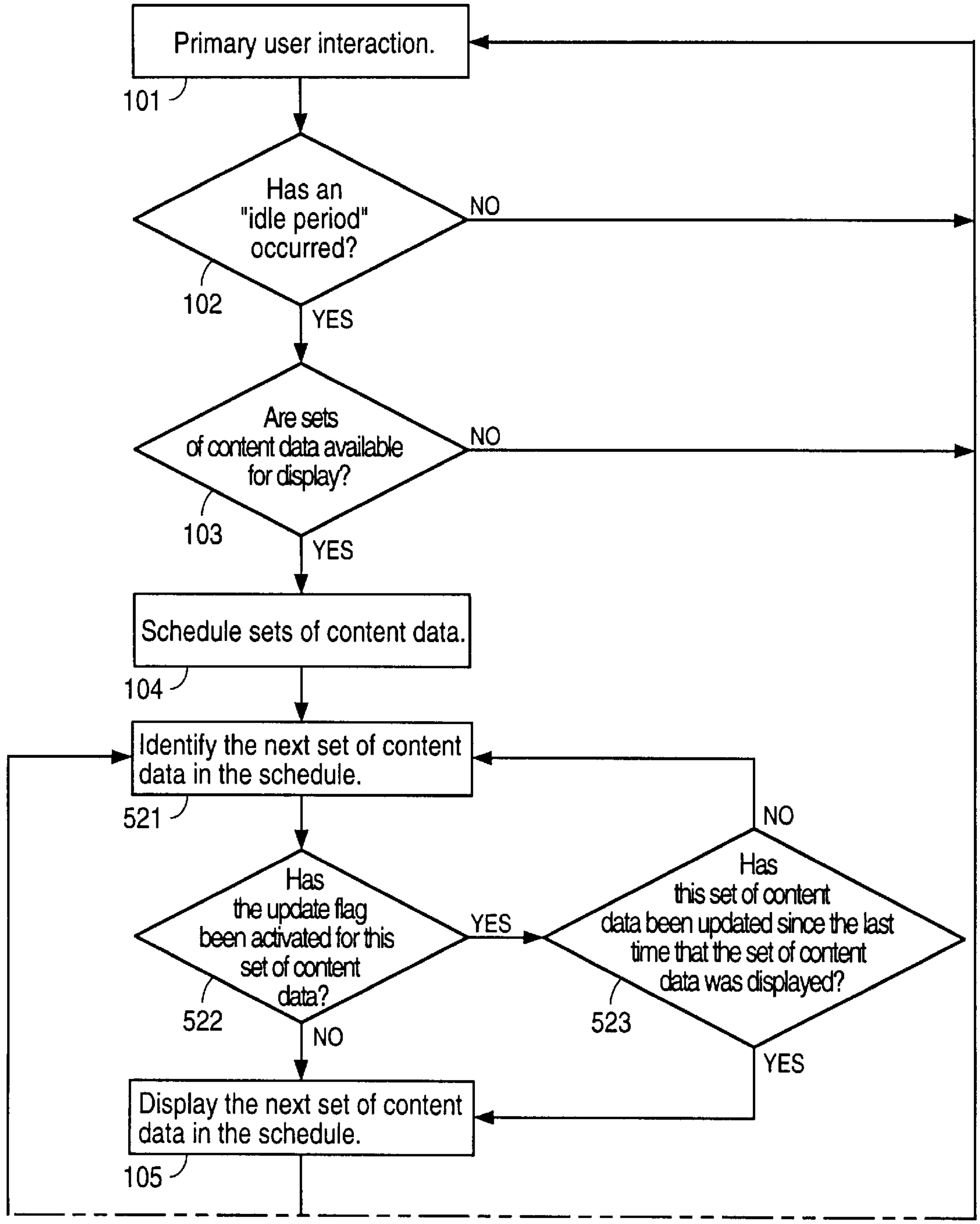
FIGS. 5 to 5C together are a flow chart of a method that implements an attention manager according to another embodiment of the invention.
Figure 5B:
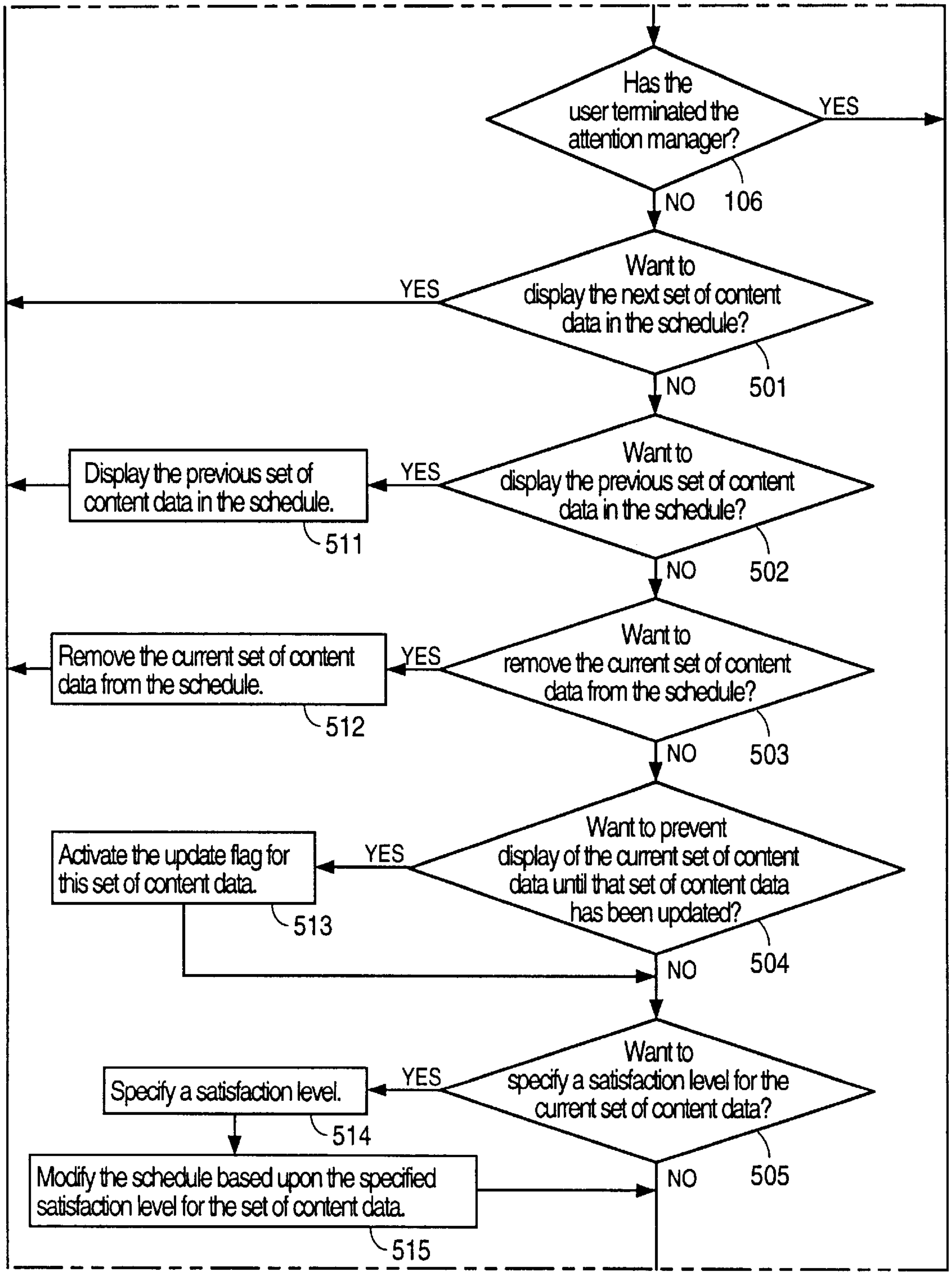
Figure 5C:
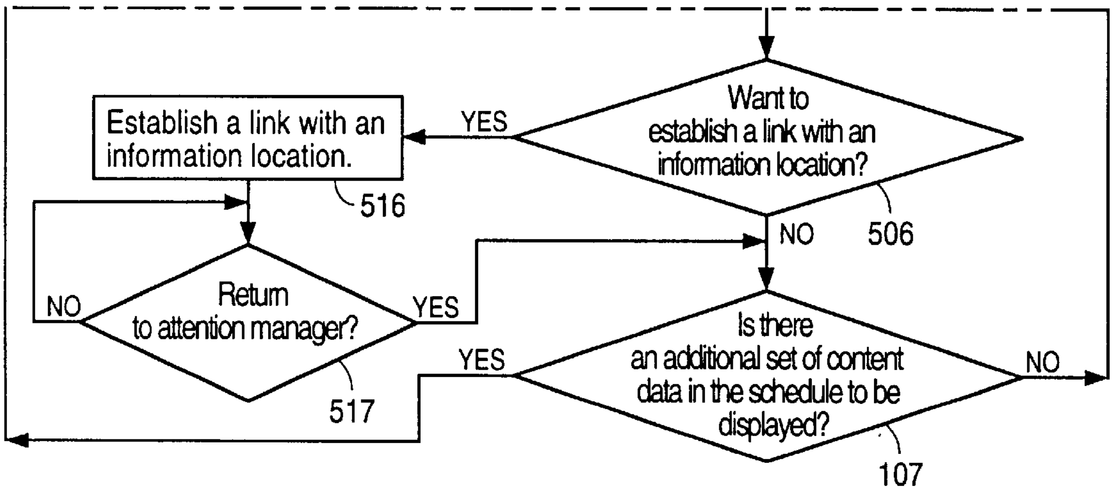
Figure 5:
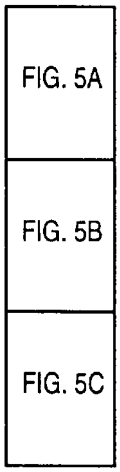

FIGS. 5A and 5B together are a flow chart of a method 500 that implements an attention manager according to another embodiment of the invention. Like the method 100 (FIG. 1), the method 500 is performed by a content display system 203 according to the invention which can be implemented, for example, using a digital computer that includes a display device and that is programmed to perform the functions of the method 500, as described below. Below, the method 500 is described as implemented on such a digital computer, though the method 500 could be implemented on other apparatus. Steps in the method 500 that are the same as steps in the method 100 are shown by like-numbered blocks. Generally, the method 500 differs from the method 100 in that the method 500 provides a number of control options that enable the user to effect particular types of control of the attention manager. While the method 500 and the associated description below illustrate several control options that can be used with an attention manager according to the invention, it is to be understood that an attention manager according to the invention could include any of a number of other options not shown in FIGS. 5A and 5B, or described specifically herein.

Figure 6:
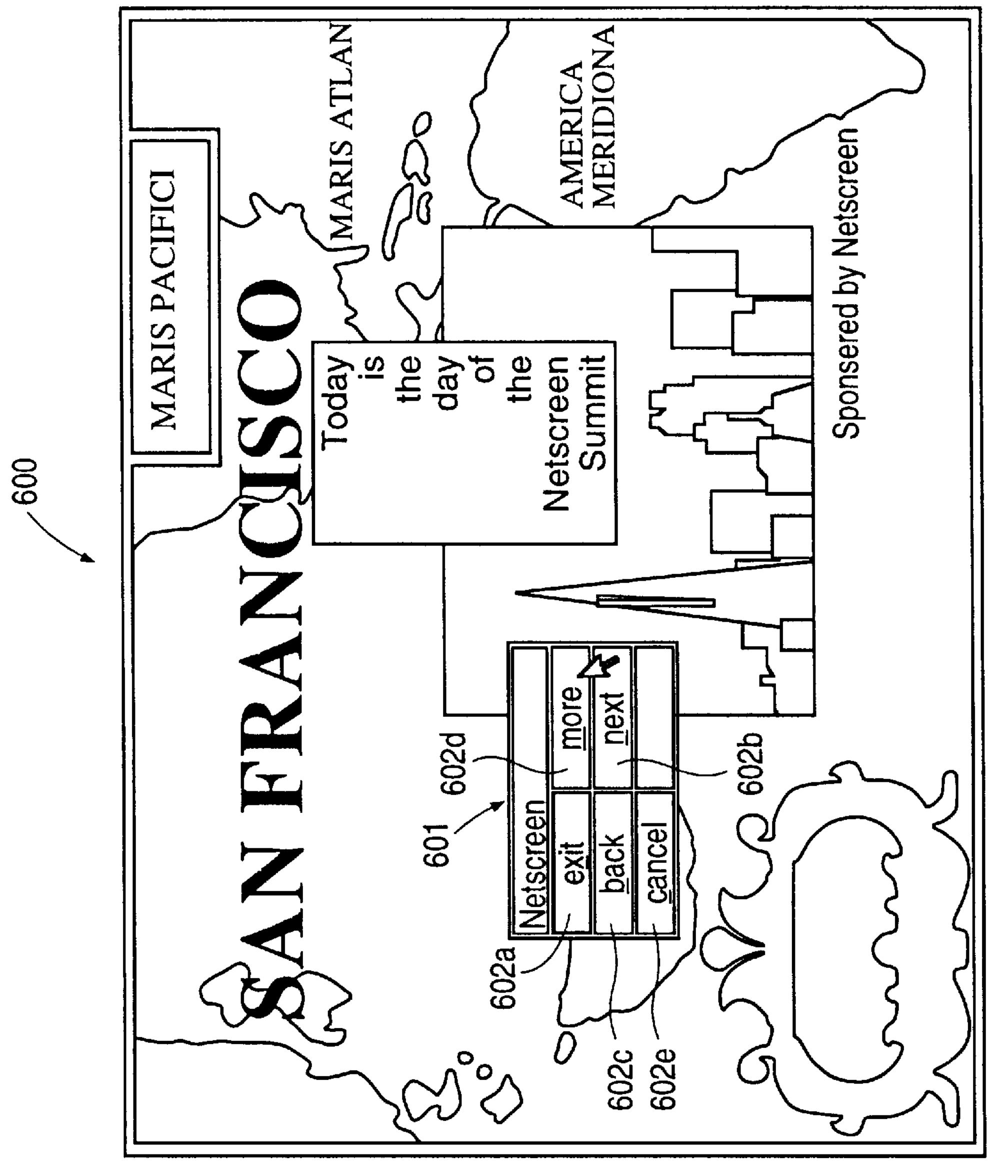
FIG. 6 illustrates a computer display screen including a user interface, according to one embodiment of the invention, that can be used to enable a user to specify a control option.

The attention manager according to this embodiment of the invention can include any suitable user interface to enable the user to specify a control option. FIG. 6 illustrates a computer display screen 600 including one embodiment of such a user interface. The screen 600 displays, in addition to an image generated from a set of content data 350, a dialog box 601 that includes a list of available control options 602*a* through 602*e*. The dialog box 601 can remain on the screen 600 during the entire time that the attention manager is operating. The available control options 602*a* through 602*e* shown in the dialog box 601—as well as additional control options that could be, but are not, included in the dialog box 601—are discussed in more detail below.

The manner of selecting an option depends upon the available user input device(s). For example, a keyboard could be used to move a cursor to a desired option, which is then selected using the Enter key. Or, a mouse could be used to move a cursor to a desired option, then clicked to select the option. Or, a touch pen could be used to contact the screen 600 (if the screen 600 is a touch-sensitive screen) at an appropriate location to cause a desired option to be selected. Or, an audio command could be issued to a voice recognition system which causes the desired option to be selected.

One control option that can be used with an attention manager according to the invention enables the user to directly terminate operation of the attention manager. In FIG. 6, this is shown as the "exit" option 602*a*. In the method 500, this option is implemented using the step 107. As discussed above, selection of the "exit" option 602*a* causes the primary user interaction to begin again (block 101).

Another control option that can be used with an attention manager according to the invention enables the user to terminate display of the currently displayed set of content data and begin display of the next scheduled set of content data. In FIG. 6, this is shown as the "next" option 602*b*. In the method 500, this option is implemented by the step shown in the block 501.

Yet another control option that can be used with an attention manager according to the invention enables the user to terminate display of the currently displayed set of content data and begin display of the set of content data displayed immediately prior to the terminated set. In FIG. 6, this is shown as the "back" option 602*c*. In the method 500, this option is implemented by the steps shown in the blocks 502 and 511.

Still another control option that can be used with an attention manager according to the invention enables the user to terminate display of the currently displayed set of content data and remove that set of content data from the schedule so that the set will not be displayed in the future. This option is not shown in FIG. 6. In the method 500, this option is implemented by the steps shown in the blocks 503 and 512. In a particular embodiment, this option can be implemented so that the set of content data is precluded from being displayed only during the current operation of the attention manager. In another particular embodiment, this option can be implemented so that the set of content data is removed from the content display system 203 entirely, i.e., the set of content data is no longer available for display. In this embodiment, the set of content data could only become available for display again if the user takes affirmative steps to re-obtain the set of content data, as described above with respect to step 401 of the method 400 (FIG. 4).

Another control option that can be used with an attention manager according to the invention enables the user to prevent future display of the currently displayed set of content data until that set of content data has been updated. This option is not shown in FIG. 6. In the method 500, this option is implemented by the steps shown in the blocks 504, 513, 521, 522 and 523 (referred to hereinafter as steps 504, 513, 521, 522 and 523, respectively). If this option is selected in step 504, then an update flag is activated. The update flag can be a designated field associated with a particular set of content data in the database that contains all of the available sets of content data. As shown by step 521, the method 500 identifies, before display of a next set of content data in the schedule, the identity of that next set, and determines (step 522) whether the update flag has been activated for that set of content data. If the update flag has not been activated, then, in step 105, the set of content data is displayed. However, if the update flag has been activated, then, in step 523, a determination is made as to whether the set of content data has been updated since the last time that the set of content data was displayed. This step can be accomplished by checking an update monitor flag that can be a designated field of the database that is associated with the set of content data. If the update monitor flag indicates that the set of content data has been updated since the last time that the set of content data was displayed, then the set of content data is displayed (step 105). Otherwise, the method 500 returns to the step 521 to identify the next set of content data in the schedule.

Yet another control option that can be used with an attention manager according to the invention enables the user to specify a level of satisfaction with the currently displayed content data. This option is not shown in FIG. 6. In the method 500, this option is implemented by the steps shown in the blocks 505, 514 and 515. Depending upon the level of satisfaction indicated in the step 514, the schedule can be modified (step 515) to show the set of content data more, less or at different times than was previously the case. This option can be implemented in any appropriate manner; one way is described immediately below.

The content display system scheduling instructions 312 can include instructions that evaluate a probability function each time that a set of content data in the schedule is presented for display, and either display or not display the set of content data dependent upon the evaluation of the probability function. The probability function can include consideration of a variety of factors (e.g., the amount of time that has passed since a particular set of content data has been updated), but for implementation of the instant option, the probability function includes a term $n^p$, where n is a constant between 1 and 2, and p is a variable that represents a user's preference for a particular set of content data. Initially, the value of p is 0. Each time that a user indicates a like or dislike for a set of content data (by, for example, selecting an appropriate option in a dialog box such as the dialog box 601), the variable p is incremented or decremented, respectively, by a predetermined amount. The content display system scheduling instructions 312 evaluate a stochastic probability function (e.g., a Gaussian probability function) using the evaluated probability function as an argument. If the result of evaluation of the stochastic probability function is "true", then the set of content data is displayed; if "false", then the set of content data is not displayed. As can be seen, then, initially (i.e., when p=0), the user has expressed no like or dislike of a set of content data and the set of content data is displayed or not according to other criteria. Incrementing or decrementing p (i.e., expressing like or dislike for a set of content data) causes the term $n^p$ to increase or decrease exponentially, thereby increasing or decreasing the likelihood that the set of content data will be displayed.

Still another control option that can be used with an attention manager according to the invention enables the user to establish a link with another information source. In FIG. 6, this is shown as the "more" option 602*d*. (In "wallpaper" embodiments of the invention, this option can be implemented so that any time the user clicks a mouse—or presses the "Enter" key on a keyboard—when the cursor is within the wallpaper, the link is made to the other information source.) In the method 500, this option is implemented by the steps shown in the blocks 506, 516 and 517. Links can be established to any of a variety of information sources and types of information sources. Typically, the link will be made to an information source that provides information that is related to the content data which was being displayed when the link was established. Upon selection by the user of this control option, the information source is accessed and additional information retrieved for presentation to the user. A link can be made, for example, to any information source that is part of a network which can be accessed by the computer with which the attention manager is being used (though it is not necessary that the link be made through a network). For example, the attention manager can be implemented so that links can be established to locations on the World Wide Web using the appropriate URLs. Such links can be established using any of a variety of Web browser software programs, such as the Navigator software program made by Netscape Communications Corp. Links are enabled by appropriately specifying the location (e.g., a network address) of the information source. The location of an information source (or locations of information sources) can be specified by associating the location with the set of content data, for example, in a package file as described and illustrated above.

As shown in the method 500, the attention manager continues to operate during the time that the link is established and the link is established to an information source from which it is possible to return to the attention manager (see step 517). The presentation of the new information to the user can include an appropriate user interface mechanism that allows the user to request such a return to the attention manager. However, the capacity to return to operation of the attention manager may not always exist. In that event, the step 517 is not part of the method 500; rather, the method 500 terminates after the step 516 and the user operates in the environment of the information source from that point forward. Such termination of the attention manager will frequently be the case where the link is made via a network to an information source.

Another control option that can be used with an attention manager according to the invention enables the user to obtain an overview of all of the content data available for display by the attention manager. This option is not shown in FIG. 6, nor is it implemented in the method 500 of FIGS. 5A and 5B. The overview could be presented textually, pictorially or aurally. The overview information can be obtained either via a link to another information location (e.g, the location of the application manager 201) as described above or from a memory associated with the content display system 203, the overview information having been communicated to the content display system 203 when a set of content data was obtained.

Still another control option that can be used with an attention manager according to the invention enables the user to maintain display of the currently displayed set of content data 350 until such display is terminated by the user. This option is not shown in FIG. 6, nor is it implemented in the method 500 of FIGS. 5A and 5B. Upon selection of this option, an appropriate user interface could be made to appear that allows the user to specify termination of the display. After termination of the display, the attention manager resumes normal operation, i.e., the next set of content data 350 is displayed.

The dialog box 601 also includes an additional option, the "cancel" option 602*e*. Selection of the "cancel" option 602*e* causes the dialog box 601 to be removed from the screen 600. The dialog box 601 can be made to reappear again using any appropriate technique. For example, the application instructions 310 can include appropriate instructions to cause the dialog box 601 to reappear when the user makes an input to the computer using an input device.

As discussed above (see FIG. 2), usage of the attention manager can be audited using audit instructions 340 (FIGS. 3A and 3C) that can be supplied by the application manager 201 to the content display systems 203, either directly or via the content providing systems 202. The audit instructions 340 can include instructions that cause a content display system 203 to record, as the attention manager is used, particular information (audit information) regarding use of the attention manager (or compute such information from other, more basic information recorded by the attention manager). The audit information can be stored by the content display system 203 in an appropriately structured database. The audit information can include, for example, the identity of each set of content data 350 displayed by the attention manager, the number of times that a set of content data 350 was displayed by the attention manager, the frequency (e.g., number of times per week) that a set of content data 350 was displayed by the attention manager, the times at which a set of content data 350 was displayed by the attention manager, a user-expressed satisfaction level for a particular set of content data 350, and the last set of content data 350 displayed to a user before the user either "passively" (i.e., by making an input to the computer with an input device) or "actively" (i.e., by selecting a control option) terminated operation of the attention manager (of interest, since the user presumably was viewing the display screen when such interaction occurred). The audit instructions can also include instructions that compile and/or analyze the audit information in a desired manner. The audit instructions 340 can also include instructions that cause audit information to be transmitted to a remote site (e.g., the application manager 201 or a content providing system 202). These instructions can include scheduling instructions that govern when the audit information is so communicated (e.g., after periodic time intervals), as well as instructions that identify the location (e.g., network address) of the remote site. The transfer of audit information can be accomplished, for example, using a conventional electronic mail mechanism, as known to those skilled in the art. The audit instructions 340 can also include instructions that enable the content display system 203 to display audit information. Additionally, the audit instructions 340 can include instructions that enable the user to disable the audit function entirely, or that enable the user to prevent audit information from being transmitted to the application manager 201 and/or to content providing systems 202. These last instructions could also be accompanied by operating instructions that provide a control option or options to the user, in a manner similar to that described above with respect to FIGS. 5A, 5B and 6, that enable the user to select disablement of the audit function. The audit instructions 340 can also include instructions that cause the database of audit information to be erased at an appropriate time, such as after the audit information has been communicated to a remote site.

Auditing of use of the attention manager can be useful to both users of the attention manager and content providers for a variety of reasons. Such auditing can be used, for example, to illustrate to content providers the value of the attention manager as a tool for disseminating the content provider's information, by showing the content providers how many content data display systems 203 are displaying the content provider's content data. The auditing can also give content providers insight into the interests of computer users, enabling the content providers to better target the information that the content providers provide. The auditing can also indicate to a user the amount and types of the information that the user has been receiving.

Various embodiments of the invention have been described. The descriptions are intended to be illustrative, not limitative. Thus, it will be apparent to one skilled in the art that certain modifications may be made to the invention as described without departing from the scope of the claims set out below. For example, though it is contemplated that an attention manager according to the invention will typically be used to occupy the peripheral attention of a human computer user, generally the attention manager can be used to occupy the attention of any sentient being. For example, the attention manager may be useful in occupying the attention of domesticated animals such as dogs or cats, or providing training (i.e., audio that can be repeated) for a "talking" bird such as a parrot.

We claim:

1. A system for engaging the peripheral attention of a person in the vicinity of a display device of an apparatus, comprising:

a content display system associated with the display device, the content display system including means for receiving a set of content data and a set of instructions for enabling a display device to selectively display, in an unobtrusive manner that does not distract a user of the apparatus from a primary interaction with the apparatus, an image or images generated from a set of content data, the content display system further including means for using the display device to selectively display the image or images using the set of instructions;

a content providing system including means for providing a set of content data to the content display system;

means for providing to the content display system a set of instructions for enabling a display device to selectively display an image or images generated from a set of content data;

first communication means for enabling communication between the means for providing and the content display system;

second communication means for enabling communication between the content providing system and the content display system; and means for auditing the display of sets of content data by the content display system.

2. A system for engaging the peripheral attention of a person in the vicinity of a display device of an apparatus, comprising:

means for acquiring a set of content data from a content providing system;

means for selectively displaying on the display device, in an unobtrusive manner that does not distract a user of the apparatus from a primary interaction with the apparatus, an image or images generated from the set of content data; and means for detecting an idle period of predetermined duration, wherein the means for selectively displaying displays the image or images automatically after detection of the idle period.

3. A system as in claim 2, further comprising means for detecting a predetermined user interaction with the apparatus subsequent to detection of the idle period, wherein occurrence of the predetermined user interaction causes the means for selectively displaying to stop displaying an image or images generated from a set of content data.

4. A system for engaging the peripheral attention of a person in the vicinity of a display device of an apparatus, comprising:

means for acquiring a set of content data from a content providing system;

means for selectively displaying on the display device, in an unobtrusive manner that does not distract a user of the apparatus from a primary interaction with the apparatus, an image or images generated from the set of content data;

means for displaying one or more control options with the display device while the means for selectively displaying is operating;

means for selecting a displayed control option; and means for controlling aspects of the operation of the system in accordance with a selected control option.

5. A system as in claim 4, wherein:

the control option enables the user to request termination of operation of the system; and the means for controlling terminates operation of the system.

6. A system as in claim 4, wherein:

the means for selectively displaying further comprises means for scheduling the display of an image or images generated from a set of content data;

the control option enables the user to request display of a next image or images generated from a next set of content data; and the means for controlling displays the next image.

7. A system as in claim 4, wherein:

the means for selectively displaying further comprises means for scheduling the display of an image or images generated from a set of content data;

the control option enables the user to request display of a previous image generated from a previous set of content data; and the means for controlling displays the previous image.

8. A system as in claim 4, wherein:

a plurality of sets of content data are acquired by the system;

the means for selectively displaying further comprises means for scheduling the display of the image or images generated from the sets of content data;

the control option enables the user to remove a set of content data from the schedule; and the means for controlling removes the set of content data from the schedule.

9. A system as in claim 4, wherein:

a plurality of sets of content data are acquired by the system, at least one of the sets of content data capable of being occasionally updated;

the means for selectively displaying further comprises means for scheduling the display of the image or images generated from the sets of content data;

the control option enables the user to prevent the display of an image generated from a designated set of content data until the designated set of content data has been updated; and the means for controlling prevents the display of the image generated from the designated set of content data until the designated set of content data has been updated.

10. A system as in claim 4, wherein:

a plurality of sets of content data are acquired by the system;

the means for selectively displaying further comprises means for scheduling the display of the image or images generated from the sets of content data;

the control option enables the user to specify a satisfaction level for a currently displayed image from a current set of content data; and the means for controlling revises the schedule in response to the specified satisfaction level.

11. A system as in claim 4, wherein:

the control option enables the user to establish a link with an information location; and the means for controlling establishes the link with the information location.

12. A method for engaging the peripheral attention of a person in the vicinity of a display device of an apparatus, comprising the steps of:

acquiring a set of content data from a content providing system;

detecting an idle period of predetermined duration; and selectively displaying on the display device, in an unobtrusive manner that does not distract a user of the apparatus from a primary interaction with the apparatus, an image or images generated from the set of content data, wherein the step of selectively displaying further comprises the step of displaying the image or images automatically after detection of the idle period.

13. A computer readable medium encoded with one or more computer programs for enabling acquisition of a set of content data and display of an image or images generated from the set of content data on a display device during operation of an attention manager, comprising:

acquisition instructions for enabling acquisition of a set of content data from a specified information source;

user interface installation instructions for enabling provision of a user interface that allows a person to request the set of content data from the specified information source;

content data scheduling instructions for providing temporal constraints on the display of the image or images generated from the set of content data, the content data scheduling instructions further comprising duration instructions for enabling specification of the duration of time that the image or images generated from a set of content data can be displayed, wherein the duration instructions specify a duration of time that is dependent upon the particular time at which the image or images generated from a set of content data are displayed after the attention manager begins operating; and display instructions for enabling display of the image or images generated from the set of content data.

14. A computer readable medium encoded with one or more computer programs for enabling acquisition of a set of content data and display of an image or images generated from the set of content data on a display device during operation of an attention manager, comprising:

acquisition instructions for enabling acquisition of a set of content data from a specified information source;

user interface installation instructions for enabling provision of a user interface that allows a person to request the set of content data from the specified information source;

content data scheduling instructions for providing temporal constraints on the display of the image or images generated from the set of content data, the content data scheduling instructions further comprising duration instructions for enabling specification of the duration of time that the image or images generated from a set of content data can be displayed, wherein the duration instructions specify a duration of time that is dependent upon the number of previous times that the image or images have been displayed during a continuous operation of the attention manager; and display instructions for enabling display of the image or images generated from the set of content data.

15. A computer readable medium encoded with one or more computer programs for enabling acquisition of a set of content data and display of an image or images generated from the set of content data on a display device during operation of an attention manager, comprising:

acquisition instructions for enabling acquisition of a set of content data from a specified information source;

user interface installation instructions for enabling provision of a user interface that allows a person to request the set of content data from the specified information source;

content data scheduling instructions for providing temporal constraints on the display of the image or images generated from the set of content data, wherein the content data scheduling instructions further comprise sequencing instructions that specify an order in which the images generated from a set of content data are displayed; and display instructions for enabling display of the image or images generated from the set of content data.

16. A computer readable medium as in claim 15, wherein the sequencing instructions further specify the duration of the display of each image or images generated from each set of content data.

17. A computer readable medium encoded with one or more computer programs for enabling acquisition of a set of content data and display of an image or images generated from the set of content data on a display device during operation of an attention manager, comprising:

acquisition instructions for enabling acquisition of a set of content data from a specified information source;

user interface installation instructions for enabling provision of a user interface that allows a person to request the set of content data from the specified information source;

content data scheduling instructions for providing temporal constraints on the display of the image or images generated from the set of content data, wherein the content data scheduling instructions further comprise saturation instructions that constrain the number of times that the image or images generated from a set of content data can be displayed; and display instructions for enabling display of the image or images generated from the set of content data.

18. A computer readable medium, for use by a content display system, encoded with one or more computer programs for enabling acquisition of a set of content data and display of an image or images generated from the set of content data on a display device during operation of an attention manager, comprising:

acquisition instructions for enabling acquisition of a set of content data from a specified information source;

user interface installation instructions for enabling provision of a user interface that allows a person to request the set of content data from the specified information source;

content data scheduling instructions for providing temporal constraints on the display of the image or images generated from the set of content data;

display instructions for enabling display of the image or images generated from the set of content data;

content data update instructions for enabling acquisition of an updated set of content data from an information source that corresponds to a previously acquired set of content data;

operating instructions for beginning, managing and terminating the display on the display device of an image generated from a set of content data;

content display system scheduling instructions for scheduling the display of the image or images on the display device;

installation instructions for installing the operating instructions and content display system scheduling instructions on the content display system; and audit instructions for monitoring usage of the content display system to selectively display an image or images generated from a set of content data.

* * * * *

UNITED STATES PATENT AND TRADEMARK OFFICE
CERTIFICATE OF CORRECTION

PATENT NO. : 6,034,652
DATED : March 7, 2000
INVENTOR(S) : Freiberger et al.

It is certified that error appears in the above-identified patent and that said Letters Patent is hereby corrected as shown below:

Title page,
Delete "Item [75] Inventors: Paul A. Freiberger, San Mateo, Calif.; Golan Levin, Staten Island, N.Y.; David P. Reed, Atherton, Calif.; Marc E. Davis, San Francisco, Calif.; Neal A. Bhadkamkar; Philippe P. Piernot, both of Palo Alto, Calif.; Todd A. Agulnick, San Francisco, Calif.; Sally N. Rosenthal, Palo Alto, Calif.; Giles N. Goodhead, Los Angeles, Calif."

and substitute

-- Item [75] Inventors: Paul A. Freiberger, San Mateo, Calif.; Philippe P. Piernot, Palo Alto, Calif.; Giles N. Goodhead, Los Angeles, Calif.; Neal A. Bhadkamkar, Palo Alto, Calif.; Todd A. Agulnick, San Francisco, Calif.; David P. Reed, Dover, Mass.; Golan Levin; Marc E. Davis, both of San Francisco, Calif.; Sally N. Rosenthal, Palo Alto, Calif.; --.

Delete "5,573,643 11/1996 Judson .................. 395/200.48"

and substitute

-- 5,572,643 11/1996 Judson .................. 395/200.48 --.

Column 5,
Line 65, delete "5 to 5C" and substitute -- 5A, 5B and 5C --;

Column 11,
Line 67, after "5B", insert --, 5C --;

Column 22,
Line 29, delete "Update Frequency" and substitute -- Update-Frequency --;
Line 34, delete "bookreview-1-a1.gif" and substitute -- bookreview-1-al.gif --;

Column 24,
Line 59, delete "5A and 5B" and substitute -- 5A, 5B and 5C --;

Column 25,
Line 12, delete "5A and" and substitute -- 5A, 5B and 5C --;
Line 13, delete "5B";

UNITED STATES PATENT AND TRADEMARK OFFICE

CERTIFICATE OF CORRECTION

PATENT NO. : 6,034,652
DATED : March 7, 2000
INVENTOR(S) : Freiberger et al.

It is certified that error appears in the above-identified patent and that said Letters Patent is hereby corrected as shown below:

<u>Column 28,</u>
Line 2, delete "5A and 5B", substitute -- 5A, 5B and 5C --;
Line 15, delete "5A and 5B", substitute -- 5A, 5B and 5C --;

<u>Column 29,</u>
Line 11, after "5B", insert --, 5C --;

<u>Column 34,</u>
Add the following claims:

19. A system as in Claim 2, further comprising means for non-volatilely storing the set of content data.

20. A system as in Claim 2, further comprising:
means for indicating a time at which the means for selectively displaying is to begin display of the image or images; and
means for activating the means for acquiring at the indicated time, such that the means for selectively displaying displays the image or images in real time as the set of content data is acquired by the means for acquiring.

21. A system as in Claim 2, wherein the means for selectively displaying further comprises means for scheduling the display of the image or images generated from a set of content data.

22. A system as in Claim 2, further comprising means for updating the set of content data.

23. A system as in Claim 22, wherein the means for updating operates without disrupting use of the apparatus by the user during the time that the means for updating is operating.

24. A system as in Claim 22, wherein the means for updating obtains the updated set of content data from the content providing system.

25. A system as in Claim 24, wherein the means for updating operates automatically, without intervention by the user.

26. A system as in Claim 24, wherein the means for updating further comprises:
means for specifying the location of the content providing system; and
means for specifying the time at which an updated set of content data is to be obtained from the content providing system.

UNITED STATES PATENT AND TRADEMARK OFFICE
CERTIFICATE OF CORRECTION

PATENT NO. : 6,034,652
DATED : March 7, 2000
INVENTOR(S) : Freiberger et al.

It is certified that error appears in the above-identified patent and that said Letters Patent is hereby corrected as shown below:

27. A system as in Claim 2, wherein the means for detecting further comprises a location in a memory that stores data representing the duration of time since a last user interaction with the apparatus, the memory location being predetermined according to a method for operating the apparatus, such that an idle period is detected when the stored duration of time is equal to the predetermined duration.

28. A system as in Claim 2, further comprising:
means for interrupting a process being implemented by the apparatus at the time that the means for selectively displaying begins operating;
means for storing information representing the state of the process at the time of interruption; and
means for beginning operation of the process, using the stored state of the process, after the means for selectively displaying stops operating.

29. A system as in Claim 2, wherein the content data is video data.

30. A system as in Claim 29, wherein display of the video data produces a still image.

31. A system as in Claim 29, wherein display of the video data produces a moving image.

32. A system as in Claim 2, wherein the content data is audio data.

33. A system as in Claim 2, wherein the apparatus is a computer.

Signed and Sealed this

Thirteenth Day of November, 2001

*Attest:*

Nicholas P. Godici

NICHOLAS P. GODICI

*Attesting Officer* *Acting Director of the United States Patent and Trademark Office*

US006034652C1

(12) EX PARTE REEXAMINATION CERTIFICATE (9050th)

United States Patent

Freiberger et al.

(10) Number: US 6,034,652 C1

(45) Certificate Issued: Jun. 5, 2012

(54) ATTENTION MANAGER FOR OCCUPYING THE PERIPHERAL ATTENTION OF A PERSON IN THE VICINITY OF A DISPLAY DEVICE

(75) Inventors: Paul A. Freiberger, San Mateo, CA (US); Philippe P. Piernot, Palo Alto, CA (US); Giles N. Goodhead, Los Angeles, CA (US); Neal A. Bhadkamkar, Palo Alto, CA (US); Todd A. Agulnick, San Francisco, CA (US); David P. Reed, Dover, MA (US); Golan Levin, San Francisco, CA (US); Marc E. Davis, San Francisco, CA (US); Sally N. Rosenthal, Palo Alto, CA (US)

(73) Assignee: Interval Licensing LLC, Seattle, WA (US)

Reexamination Request:

No. 90/011,576, Mar. 16, 2011

Reexamination Certificate for:

| | |
|---|---|
| Patent No.: | **6,034,652** |
| Issued: | **Mar. 7, 2000** |
| Appl. No.: | **08/620,641** |
| Filed: | **Mar. 22, 1996** |

Certificate of Correction issued Nov. 13, 2001.

(51) Int. Cl.
*G09F 27/00* (2006.01)

(52) U.S. Cl. ....................................... 715/730; 709/218

(58) Field of Classification Search ........................ None
See application file for complete search history.

(56) References Cited

To view the complete listing of prior art documents cited during the proceeding for Reexamination Control Number 90/011,576, please refer to the USPTO's public Patent Application Information Retrieval (PAIR) system under the Display References tab.

*Primary Examiner*—Deandra Hughes

(57) ABSTRACT

An attention manager presents information to a person in the vicinity of a display device in a manner that engages at least the peripheral attention of the person. The information is embodied by one or more sets of content data (e.g., video or audio data). Each set of content data is formulated by a content provider and made available for use by content display systems. Upon appropriate activation, each content display system displays images corresponding to the sets of content data in accordance with predetermined scheduling informaton. The attention manager makes use of "unused capacity" of the display device and the person's attention, providing information to the person that the person might not otherwise expend adequate energy to obtain. The attention manager also affords an opportunity to content providers to disseminate their information to people that are interested in receiving such information, enabling the content providers to provide better directed information dissemination, as well as providing access to the previously unused attention capacity of those interested people.

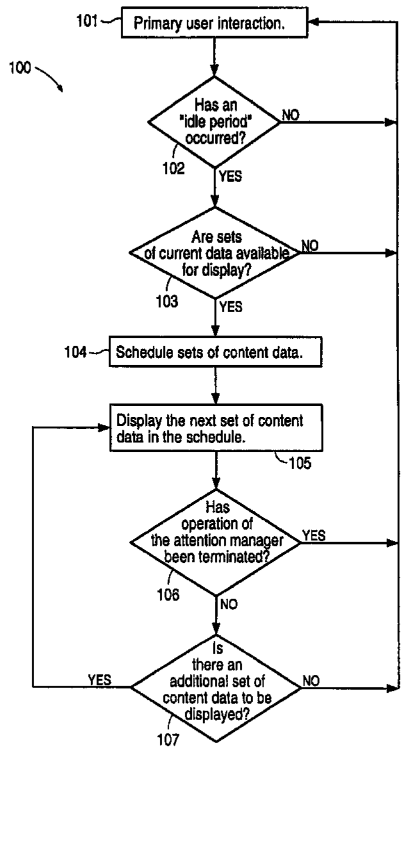

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4-8, 11 and 15-18 is confirmed.

New claims 34-67 are added and determined to be patentable.

Claims 1-3, 9-10, 12-14 and 19-33 were not reexamined.

*34. A system as in claim 4, wherein:*

*the means for selectively displaying said image or images generated from the set of content data in an unobtrusive manner enables said image or images to be displayed during an active period of the primary interaction with the display device or apparatus.*

*35. A system as in claim 34, wherein:*

*the means for selectively displaying said image or images generated from the set of content data in an unobtrusive manner enables said image or images to be displayed in an area of the display device that is not used by the primary interaction.*

*36. A system as in claim 11, wherein:*

*the link comprises a Universal Resource Locator (URL) of the information location.*

*37. A system as in claim 11, wherein:*

*the means for controlling uses the established link to retrieve information from the information location, wherein the information is related to the selective display of the image or images generated from the set of content data.*

*38. The computer readable medium of claim 15, wherein the user interface installation instructions enable provision of the user interface on each of a plurality of user computers.*

*39. The computer readable medium of claim 15, wherein the user interface provided by the user interface installation instructions enables the person, during display of the image or images generated from the set of content data, to request information from another specified information source.*

*40. The computer readable medium of claim 39, wherein the requested information is another set of content data.*

*41. The computer readable medium of claim 17, wherein the user interface installation instructions enable provision of the user interface on each of a plurality of user computers.*

*42. The computer readable medium of claim 17, wherein the user interface provided by the user interface installation instructions enables the person, during display of the image or images generated from the set of content data, to request information from another specified information source.*

*43. The computer readable medium of claim 42, wherein the requested information is another set of content data.*

*44. The computer readable medium of claim 18, wherein the user interface installation instructions enable provision of the user interface on each of a plurality of user computers.*

*45. The computer readable medium of claim 18, wherein the user interface provided by the user interface installation instructions enables the person, during display of the image or images generated from the set of content data, to request information from another specified information source.*

*46. The computer readable medium of claim 45, wherein the requested information is another set of content data.*

*47. The computer readable medium of claim 15, wherein the user interface provided by the user interface installation instructions enables the person to indicate interest in particular information provided by a specified information source.*

*48. The computer readable medium of claim 47, wherein the particular information is a particular set of content data.*

*49. The computer readable medium of claim 17, wherein the user interface provided by the user interface installation instructions enables the person to indicate interest in particular information provided by a specified information source.*

*50. The computer readable medium of claim 49, wherein the particular information is a particular set of content data.*

*51. The computer readable medium of claim 18, wherein the user interface provided by the user interface installation instructions enables the person to indicate interest in particular information provided by a specified information source.*

*52. The computer readable medium of claim 51, wherein the particular information is a particular set of content data.*

*53. The computer readable medium of claim 15, wherein the user interface provided by the user interface installation instructions further enables the person to directly request a particular set of content data from one of a plurality of information sources.*

*54. The computer readable medium of claim 15, wherein the user interface provided by the user interface installation instructions further enables the person to select a particular information source from which to request a set of content data.*

*55. The computer readable medium of claim 15, wherein the user interface provided by the user interface installation instructions further enables the person to select a control option that enables the user to establish a link with an information location.*

*56. The computer readable medium of claim 55, wherein the link comprises a Universal Resource Locator (URL) of the information location.*

*57. The computer readable medium of claim 55, wherein the acquisition instructions further enable acquisition of the set of content data from the information location.*

*58. The computer readable medium of claim 17, wherein the user interface provided by the user interface installation instructions further enables the person to directly request a particular set of content data from one of a plurality of information sources.*

*59. The computer readable medium of claim 17, wherein the user interface provided by the user interface installation instructions further enables the person to select a particular information source from which to request a set of content data.*

*60. The computer readable medium of claim 17, wherein the user interface provided by the user interface installation instructions further enables the person to select a control option that enables the user to establish a link with an information location.*

*61. The computer readable medium of claim 60, wherein the link comprises a Universal Resource Locator (URL) of the information location.*

*62. The computer readable medium of claim 60, wherein the acquisition instructions further enable acquisition of the set of content data from the information location.*

*63. The computer readable medium of claim 18, wherein the user interface provided by the user interface installation instructions further enables the person to directly request a particular set of content data from one of a plurality of information sources.*

*64. The computer readable medium of claim 18, wherein the user interface provided by the user interface installation instructions further enables the person to select a particular information source from which to request a set of content data.*

*65. The computer readable medium of claim 18, wherein the user interface provided by the user interface installation instructions further enables the person to select a control option that enables the user to establish a link with an information location.*

*66. The computer readable medium of claim 65, wherein the link comprises a Universal Resource Locator (URL) of the information location.*

*67. The computer readable medium of claim 65, wherein the acquisition instructions further enable acquisition of the set of content data from the information location.*

* * * * *